United States Patent
Abedini et al.

(10) Patent No.: US 11,832,276 B2
(45) Date of Patent: Nov. 28, 2023

(54) TECHNIQUES FOR COMMUNICATING USING A RELAY NODE

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/443,108

(22) Filed: Jul. 21, 2021

(65) Prior Publication Data
US 2022/0046637 A1    Feb. 10, 2022

Related U.S. Application Data

(60) Provisional application No. 62/706,177, filed on Aug. 4, 2020.

(51) Int. Cl.
| | |
|---|---|
| *H04W 8/24* | (2009.01) |
| *H04W 72/27* | (2023.01) |
| *H04W 72/0453* | (2023.01) |
| *H04W 92/20* | (2009.01) |

(52) U.S. Cl.
CPC ............ *H04W 72/27* (2023.01); *H04W 8/24* (2013.01); *H04W 72/0453* (2013.01); *H04W 92/20* (2013.01)

(58) Field of Classification Search
CPC ... H04W 72/27; H04W 8/24; H04W 72/0453; H04W 92/20; H04W 72/044; H04W 84/047; H04W 88/04; H04W 88/06; H04W 84/042; H04W 76/20; H04B 7/15528
See application file for complete search history.

(56) References Cited

U.S. PATENT DOCUMENTS

| | | |
|---|---|---|
| 2005/0232223 A1 | 10/2005 | Muller |
| 2008/0311848 A1 | 12/2008 | Proctor, Jr. et al. |
| 2018/0213379 A1* | 7/2018 | Xiong ...................... H04W 4/70 |
| 2019/0380159 A1* | 12/2019 | Bangolae .............. H04W 76/14 |
| 2020/0195310 A1 | 6/2020 | Abedini et al. |
| 2020/0403689 A1* | 12/2020 | Rofougaran ........ H04W 52/245 |

FOREIGN PATENT DOCUMENTS

EP      1109332 A2    6/2001

OTHER PUBLICATIONS

International Search Report and Written Opinion—PCT/US2021/070929—ISA/EPO—dated Oct. 29, 2021.

\* cited by examiner

*Primary Examiner* — Thai Nguyen
(74) *Attorney, Agent, or Firm* — Dalei Dong; Harrity & Harrity, LLP

(57) ABSTRACT

Various aspects of the present disclosure generally relate to wireless communication. In some aspects, a relay node may receive, from a first wireless node via a first wireless link, a first communication, generate, using a digital processing operation, a second communication based at least in part on an information of the first communication, wherein the second communication is different than the first communication, and transmit, to a second wireless node via a second wireless link, the second communication. Numerous other aspects are provided.

28 Claims, 15 Drawing Sheets

TECHNIQUES FOR COMMUNICATING USING A RELAY NODE

CROSS-REFERENCE TO RELATED APPLICATION

This Patent Application claims priority to U.S. Provisional Patent Application No. 62/706,177, filed on Aug. 4, 2020, entitled "TECHNIQUES FOR COMMUNICATING USING A RELAY NODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for communicating using a relay node.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or SC-FDM (e.g., also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a relay node includes: receiving, from a control node via a wireless control interface, a control configuration for a relaying operation; receiving, via a first wireless link, a first communication based at least in part on the control configuration for the relaying operation; generating, using a digital processing operation indicated by the control configuration, a second communication based at least in part on an information of the first communication, wherein the second communication is different than the first communication; and transmitting, via a second wireless link, the second communication based at least in part on the control configuration for the relaying operation.

In some aspects, the first wireless link is a wireless fronthaul link and the second wireless link is a wireless access link, and the first communication is a downlink communication and the second communication is a downlink communication.

In some aspects, receiving, via the first wireless link, the first communication, comprises decoding the first communication; and determining the information of the first communication based at least in part on decoding the first communication.

In some aspects, the information of the first communication comprises at least one of one or more time domain in-phase/quadrature (IQ) samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

In some aspects, receiving, via the first wireless link, the first communication, comprises receiving the first communication using a first operating frequency; and wherein transmitting, via the second wireless link, the second communication, comprises transmitting the second communication using the first operating frequency or a second operating frequency.

In some aspects, the first operating frequency is a higher frequency than the second operating frequency. In some aspects, the first operating frequency is a lower frequency than the second operating frequency.

In some aspects, receiving, via the first wireless link, the first communication, comprises receiving a physical downlink shared channel (PDSCH) communication indicating the information of the first communication.

In some aspects, receiving, via the first wireless link, the first communication, comprises receiving a physical downlink control channel communication that schedules the PDSCH communication.

In some aspects, generating, using the digital processing operation, the second communication based at least in part on the information of the first communication, comprises generating a physical downlink shared channel (PDSCH) communication, wherein the digital processing operation is based at least in part on the information of the first communication.

In some aspects, generating, using the digital processing operation, the second communication based at least in part on the information of the first communication, comprises generating a physical downlink control channel (PDCCH) communication to schedule the PDSCH communication.

In some aspects, transmitting, via the second wireless link, the second communication comprises transmitting the PDCCH communication that schedules the PDSCH communication; and transmitting the PDSCH communication based at least in part on the transmission of the PDCCH communication.

In some aspects, the information of the first communication indicates transmit configuration information associated with the second communication.

In some aspects, the transmit configuration information includes at least one of a resource allocation for the second communication, or a beamforming configuration for the second communication.

In some aspects, generating, using the digital processing operation, the second communication based at least in part on the information of the first communication, is based at least in part on the transmit configuration information.

In some aspects, transmitting, via the second wireless link, the second communication, is based at least in part on the transmit configuration information.

In some aspects, the first wireless link is a wireless access link and the second wireless link is a wireless fronthaul link, and the first communication is an uplink communication and the second communication is an uplink communication.

In some aspects, receiving, via the first wireless link, the first communication, is based at least in part on the control configuration for the relaying operation.

In some aspects, generating, using the digital processing operation, the second communication based at least in part on the information of the first communication, comprises digitally processing the first communication in accordance with the control configuration for the relaying operation; and determining information associated with the first communication based at least in part on the digital processing of the first communication; and generating the second communication that includes an information that indicates the information associated with the first communication.

In some aspects, the information associated with the first communication comprises at least one of one or more time domain IQ samples associated with the first communication, one or more frequency domain IQ samples associated with the first communication, one or more IQ samples of occupied tones associated with the first communication, a received codeword associated with the first communication, a transport block associated with the first communication, a received reference signal associated with the first communication, or one or more parameters of a received reference signal associated with the first communication.

In some aspects, the control configuration for the relaying operation indicates information associated with relaying the first communication.

In some aspects, the information associated with relaying the first communication comprises at least one of a resource allocation associated with receiving the first communication, a resource allocation associated with transmitting the second communication, or a configuration associated with the first communication.

In some aspects, the information associated with relaying the first communication indicates a scheduling grant associated with scheduling the first communication, and the method includes transmitting, via the first wireless link, a control channel communication indicating the scheduling grant associated with scheduling the first communication.

In some aspects, receiving, via the first wireless link, the first communication comprises receiving, via a wireless access link, a first physical uplink shared channel (PUSCH) communication.

In some aspects, transmitting, via the second wireless link, the second communication comprises transmitting, via a wireless fronthaul link, a second PUSCH communication, wherein an information of the second PUSCH communication indicates information associated with the first PUSCH communication.

In some aspects, receiving, via the first wireless link, the first communication comprises receiving, via a wireless access link, a first physical uplink control channel (PUCCH) communication.

In some aspects, transmitting, via the second wireless link, the second communication comprises transmitting, via a wireless fronthaul link, a second PUCCH communication, wherein an information of the second PUCCH communication indicates information associated with the first PUCCH communication.

In some aspects, the method includes establishing, by a mobile terminal unit of the relay node, the wireless control interface with the control node.

In some aspects, receiving, via the first wireless link, the first communication, comprises receiving the first communication using an operating frequency; and wherein receiving, from the control node via the wireless control interface, the control configuration for the relaying operation comprises: receiving the control configuration using the operating frequency.

In some aspects, receiving the control configuration using the operating frequency comprises receiving the control configuration using a bandwidth part associated with the operating frequency.

In some aspects, receiving, via the first wireless link, the first communication, comprises receiving the first communication using a first radio access technology (RAT); and wherein receiving, from the control node via the wireless control interface, the control configuration for the relaying operation comprises receiving the control configuration using a second RAT.

In some aspects, receiving, via the first wireless link, the first communication, comprises receiving the first communication using a first operating frequency; and wherein receiving, from the control node via the wireless control interface, the control configuration for the relaying operation, comprises receiving the control configuration using a second operating frequency.

In some aspects, transmitting, via the second wireless link, the second communication, comprises transmitting the second communication using an operating frequency; and wherein receiving, from the control node via the wireless control interface, the control configuration for the relaying operation comprises receiving the control configuration using the operating frequency.

In some aspects, transmitting, via the second wireless link, the second communication comprises transmitting the second communication using a first RAT; and receiving, from the control node via the wireless control interface, the control configuration for the relaying operation comprises: receiving the control configuration using a second RAT.

In some aspects, transmitting, via the second wireless link, the second communication, comprises transmitting the second communication using a first operating frequency; and receiving, from the control node via the control interface, the control configuration, comprises receiving the control configuration using a second operating frequency.

In some aspects, receiving, from the control node via the wireless control interface, the control configuration for the relaying operation comprises receiving the control configuration using at least one of radio resource control signaling, medium access control signaling, downlink control information signaling, lower-layer signaling, upper-layer signaling, or application-layer signaling.

In some aspects, the control configuration for the relaying operation indicates at least one of a receive configuration, a transmit configuration, a reporting configuration, a numerology configuration, a beamforming configuration, resource element mapping information, channel estimation information, modulation order information, layer mapping information, a precoding configuration, one or more scrambling identifiers, or a network coding configuration.

In some aspects, the receive configuration indicates at least one of a receive analog beamforming configuration, a time domain resource allocation associated with receiving uplink communications, receive frequency information, an analog-to-digital conversion configuration, or an IQ sample compression setting.

In some aspects, the transmit configuration indicates at least one of a transmit analog beamforming configuration, a time domain resource allocation associated with transmitting downlink communications, a transmit power setting, a transmit amplification setting, a transmit center frequency, or an IQ sample decompression setting.

In some aspects, the reporting configuration indicates a request for at least one of a buffer status of the relay node, a power status of the relay node, a measurement report indicating measurements performed by the relay node, or one or more relaying capabilities of the relay node.

In some aspects, the numerology configuration indicates at least one of a cyclic prefix size to be used by the relay node, a subcarrier spacing size to be used by the relay node, or a fast Fourier transform size to be used by the relay node.

In some aspects, the beamforming configuration indicates one or more beam indexes associated with a beamforming codebook stored by the relay node.

In some aspects, the beamforming configuration indicates at least one of a phase setting for one or more antenna elements of the relay node, or an amplitude setting for one or more antenna elements of the relay node.

In some aspects, the control configuration for the relaying operation includes a set of information elements, and receiving, from the control node via the wireless control interface, the control configuration for the relaying operation comprises dynamically receiving, from the control node via the wireless control interface, a first subset of information elements of the set of information elements; and semi-statically receiving, from the control node via the wireless control interface, a second subset of information elements of the set of information elements.

In some aspects, receiving, via the first wireless link, the first communication comprises receiving, from the control node, the first communication.

In some aspects, transmitting, via the second wireless link, the second communication comprises transmitting, to the control node, the second communication.

In some aspects, the method includes transmitting, to the control node via the wireless control interface, a configuration indicating a relaying capability of the relay node.

In some aspects, the configuration indicating the relaying capability of the relay node indicates at least one of one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an IQ sample compression capability.

In some aspects, receiving, via the first wireless link, the first communication comprising performing a reception beamforming operation indicated in the control configuration for the relaying operation; and receiving the first communication based at least in part on performing the reception beamforming operation.

In some aspects, transmitting, via the second wireless link, the second communication comprises performing a transmission beamforming operation indicated in the control configuration for the relaying operation; and transmitting the second communication based at least in part on performing the transmission beamforming operation.

In some aspects, the relay node is a Layer 1 relay node.

In some aspects, the wireless control interface is associated with the first wireless link or the second wireless link.

In some aspects, a method of wireless communication performed by a control node includes: receiving, from a relay node via a wireless control interface, a configuration indicating a relaying capability of the relay node; transmitting, to the relay node via the wireless control interface, a control configuration for a relaying operation; and communicating, with the relay node via a wireless link associated with the wireless control interface, to perform the relaying operation in accordance with the control configuration.

In some aspects, the method includes determining the control configuration for a relaying operation based at least in part on the configuration indicating a relaying capability of the relay node.

In some aspects, the wireless link is a wireless fronthaul link.

In some aspects, communicating, with the relay node via a wireless link associated with the wireless control interface, to perform the relaying operation in accordance with the control configuration comprises transmitting, to the relay node via the wireless link, a communication that indicates information and the control configuration for the relaying operation.

In some aspects, the information of the communication comprises at least one of: one or more time domain IQ samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

In some aspects, communicating, with the relay node via a wireless link associated with the wireless control interface, to perform the relaying operation in accordance with the control configuration comprises transmitting, to the relay node, a PDSCH communication indicating information associated with a communication to be transmitted by the relay node to a wireless node.

In some aspects, communicating, with the relay node via a wireless link associated with the wireless control interface, to perform the relaying operation in accordance with the control configuration comprises transmitting, to the relay node, a physical downlink control channel communication that schedules the PDSCH communication.

In some aspects, transmitting, to the relay node via the wireless control interface, the control configuration for a relaying operation comprises transmitting, to the relay node, transmit configuration information associated with the relaying operation.

In some aspects, the transmit configuration information includes at least one of a resource allocation for a communication to be transmitted by the relay node, or a beamforming configuration for a communication to be transmitted by the relay node.

In some aspects, communicating, with the relay node via a wireless link associated with the wireless control interface, to perform the relaying operation in accordance with the control configuration comprises receiving, from the relay node, a first communication that includes information, wherein the information indicates information associated with a second communication that was received by the relay node.

In some aspects, the information associated with a second communication that was received by the relay node comprises at least one of: one or more time domain IQ samples associated with the second communication, one or more frequency domain IQ samples associated with the second communication, one or more IQ samples of occupied tones associated with the second communication, a received codeword associated with the second communication, a transport block associated with the second communication, a received reference signal associated with the second communication, or one or more parameters of a received reference signal associated with the second communication.

In some aspects, communicating, with the relay node via a wireless link associated with the wireless control interface, to perform the relaying operation in accordance with the control configuration comprises receiving, from the relay node via a wireless fronthaul link, a first PUSCH communication, wherein an information of the first PUSCH communication indicates information associated with a second PUSCH communication that was received by the relay node.

In some aspects, communicating, with the relay node via a wireless link associated with the wireless control interface, to perform the relaying operation in accordance with the control configuration comprises receiving, from the relay node via a wireless fronthaul link, a first PUCCH communication, wherein an information of the first PUCCH communication indicates information associated with a second PUCCH communication that was received by the relay node.

In some aspects, the method includes establishing, with a mobile terminal unit of the relay node, the wireless control interface with the control node.

In some aspects, communicating, with the relay node via the wireless link associated with the wireless control interface, to perform the relaying operation in accordance with the control configuration comprises communicating, with the relay node via the wireless link associated with the wireless control interface, using an operating frequency; and transmitting, to the control node via the wireless control interface, the control configuration for the relaying operation comprises transmitting the control configuration using the operating frequency.

In some aspects, transmitting the control configuration using the operating frequency comprises transmitting the control configuration using a bandwidth part associated with the operating frequency.

In some aspects, communicating, with the relay node via the wireless link associated with the wireless control interface, to perform the relaying operation in accordance with the control configuration comprises communicating, with the relay node via the wireless link associated with the wireless control interface, using a first RAT; and transmitting, to the control node via the wireless control interface, the control configuration for the relaying operation comprises transmitting the control configuration using a second RAT.

In some aspects, communicating, with the relay node via the wireless link associated with the wireless control interface, to perform the relaying operation in accordance with the control configuration comprises communicating, with the relay node via the wireless link associated with the wireless control interface, using a first operating frequency; and transmitting, to the control node via the wireless control interface, the control configuration for the relaying operation comprises transmitting the control configuration using a second operating frequency.

In some aspects, transmitting, to the relay node via the wireless control interface, the control configuration for the relaying operation comprises transmitting the control configuration using at least one of radio resource control signaling, medium access control signaling, downlink control information signaling, lower-layer signaling, upper-layer signaling, or application-layer signaling.

In some aspects, the control configuration for the relaying operation indicates at least one of a receive configuration, a transmit configuration, a reporting configuration, a numerology configuration, a beamforming configuration, resource element mapping information, channel estimation information, modulation order information, layer mapping information, a precoding configuration, one or more scrambling identifiers, or a network coding configuration.

In some aspects, the receive configuration indicates at least one of a receive analog beamforming configuration, a time domain resource allocation associated with the relay node receiving uplink communications, receive frequency information, an analog-to-digital conversion configuration, or an IQ sample compression setting.

In some aspects, the transmit configuration indicates at least one of a transmit analog beamforming configuration, a time domain resource allocation associated with the relay node transmitting downlink communications, a transmit power setting, a transmit amplification setting, a transmit center frequency, or an IQ sample decompression setting.

In some aspects, the reporting configuration indicates a request for at least one of: a buffer status of the relay node, a power status of the relay node, a measurement report indicating measurements performed by the relay node, or one or more relaying capabilities of the relay node.

In some aspects, the numerology configuration indicates at least one of a cyclic prefix size to be used by the relay node, a subcarrier spacing size to be used by the relay node, or a fast Fourier transform size to be used by the relay node.

In some aspects, the beamforming configuration indicates one or more beam indexes associated with a beamforming codebook stored by the relay node.

In some aspects, the beamforming configuration indicates at least one of a phase setting for one or more antenna elements of the relay node, or an amplitude setting for one or more antenna elements of the relay node.

In some aspects, the control configuration for the relaying operation includes a set of information elements, and transmitting, to the relay node via the wireless control interface, the control configuration for the relaying operation comprises dynamically transmitting, to the relay node via the wireless control interface, a first subset of information elements of the set of information elements; and semi-statically transmitting, to the relay node via the wireless control interface, a second subset of information elements of the set of information elements.

In some aspects, the configuration indicating the relaying capability of the relay node indicates at least one of one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an IQ sample compression capability.

In some aspects, the relay node is a Layer 1 relay node.

In some aspects, a relay node for wireless communication includes: a memory and one or more processors, coupled to the memory, configured to: receive, from a control node via a wireless control interface, a control configuration for a relaying operation; receive, via a first wireless link, a first communication based at least in part on the control configuration for the relaying operation; generate, using a digital processing operation indicated by the control configuration, a second communication based at least in part on an information of the first communication, wherein the second communication is different than the first communication; and transmit, via a second wireless link, the second communication based at least in part on the control configuration for the relaying operation.

In some aspects, a control node for wireless communication includes a memory and one or more processors, coupled to the memory, configured to: receive, from a relay node via a wireless control interface, a configuration indicating a relaying capability of the relay node; transmit, to the relay node via the wireless control interface, a control configuration for a relaying operation; and communicate, with the relay node via a wireless link associated with the wireless control interface, to perform the relaying operation in accordance with the control configuration.

In some aspects, a non-transitory computer-readable medium storing a set of instructions for wireless communication includes: one or more instructions that, when executed by one or more processors of a relay node, cause the relay node to: receive, from a control node via a wireless control interface, a control configuration for a relaying operation; receive, via a first wireless link, a first communication based at least in part on the control configuration for the relaying operation; generate, using a digital processing operation indicated by the control configuration, a second communication based at least in part on an information of the first communication, wherein the second communication is different than the first communication; and transmit, via a second wireless link, the second communication based at least in part on the control configuration for the relaying operation.

In some aspects, a non-transitory computer-readable medium storing a set of instructions for wireless communication includes: one or more instructions that, when executed by one or more processors of a control node, cause the control node to: receive, from a relay node via a wireless control interface, a configuration indicating a relaying capability of the relay node; transmit, to the relay node via the wireless control interface, a control configuration for a relaying operation; and communicate, with the relay node via a wireless link associated with the wireless control interface, to perform the relaying operation in accordance with the control configuration.

In some aspects, an apparatus for wireless communication includes: means for receiving, from a control node via a wireless control interface, a control configuration for a relaying operation; means for receiving, via a first wireless link, a first communication based at least in part on the control configuration for the relaying operation; means for generating, using a digital processing operation indicated by the control configuration, a second communication based at least in part on an information of the first communication, wherein the second communication is different than the first communication; and means for transmitting, via a second wireless link, the second communication based at least in part on the control configuration for the relaying operation.

In some aspects, an apparatus for wireless communication includes: means for receiving, from a relay node via a wireless control interface, a configuration indicating a relaying capability of the relay node; means for transmitting, to the relay node via the wireless control interface, a control configuration for a relaying operation; and means for communicating, with the relay node via a wireless link associated with the wireless control interface, to perform the relaying operation in accordance with the control configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
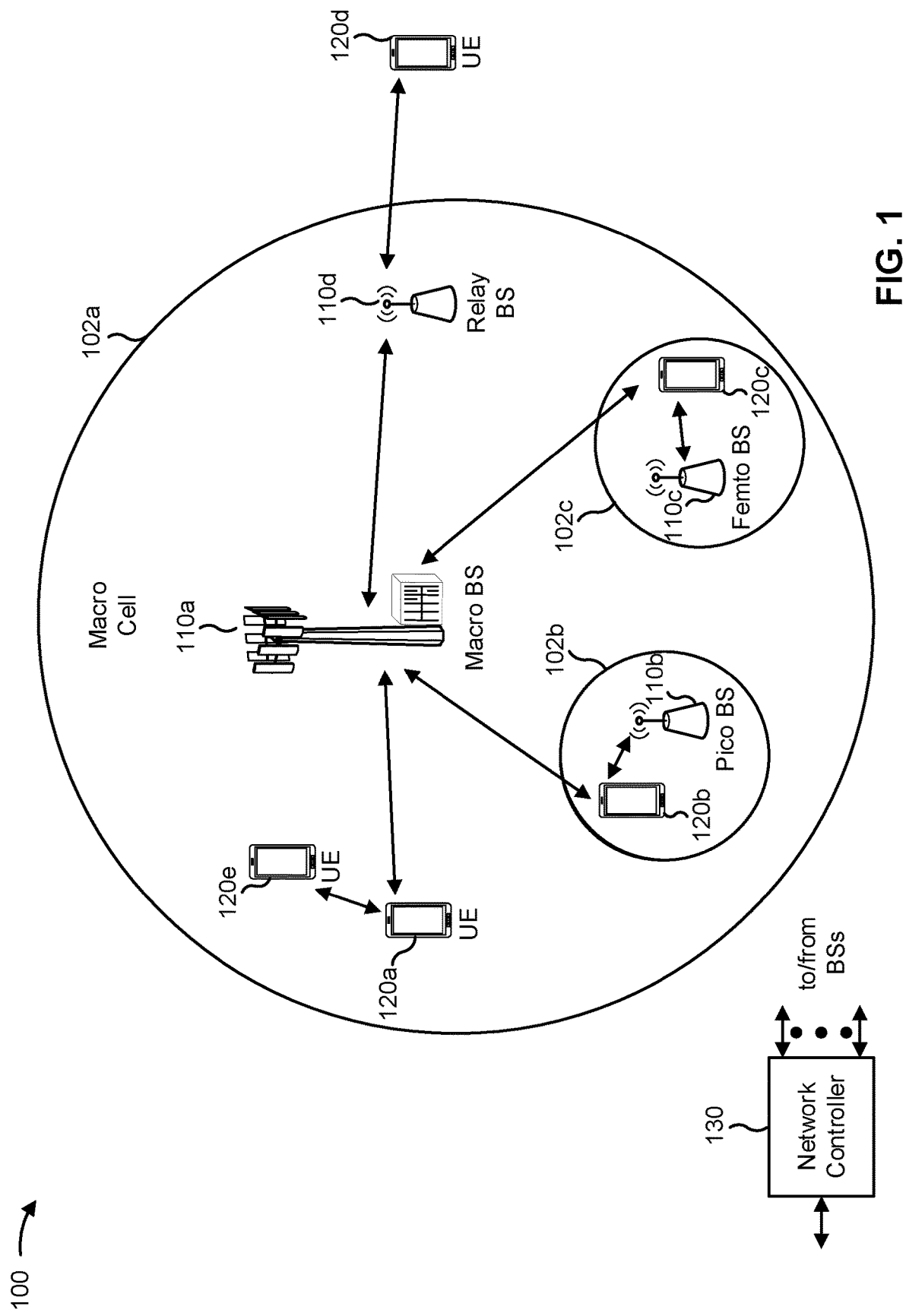
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
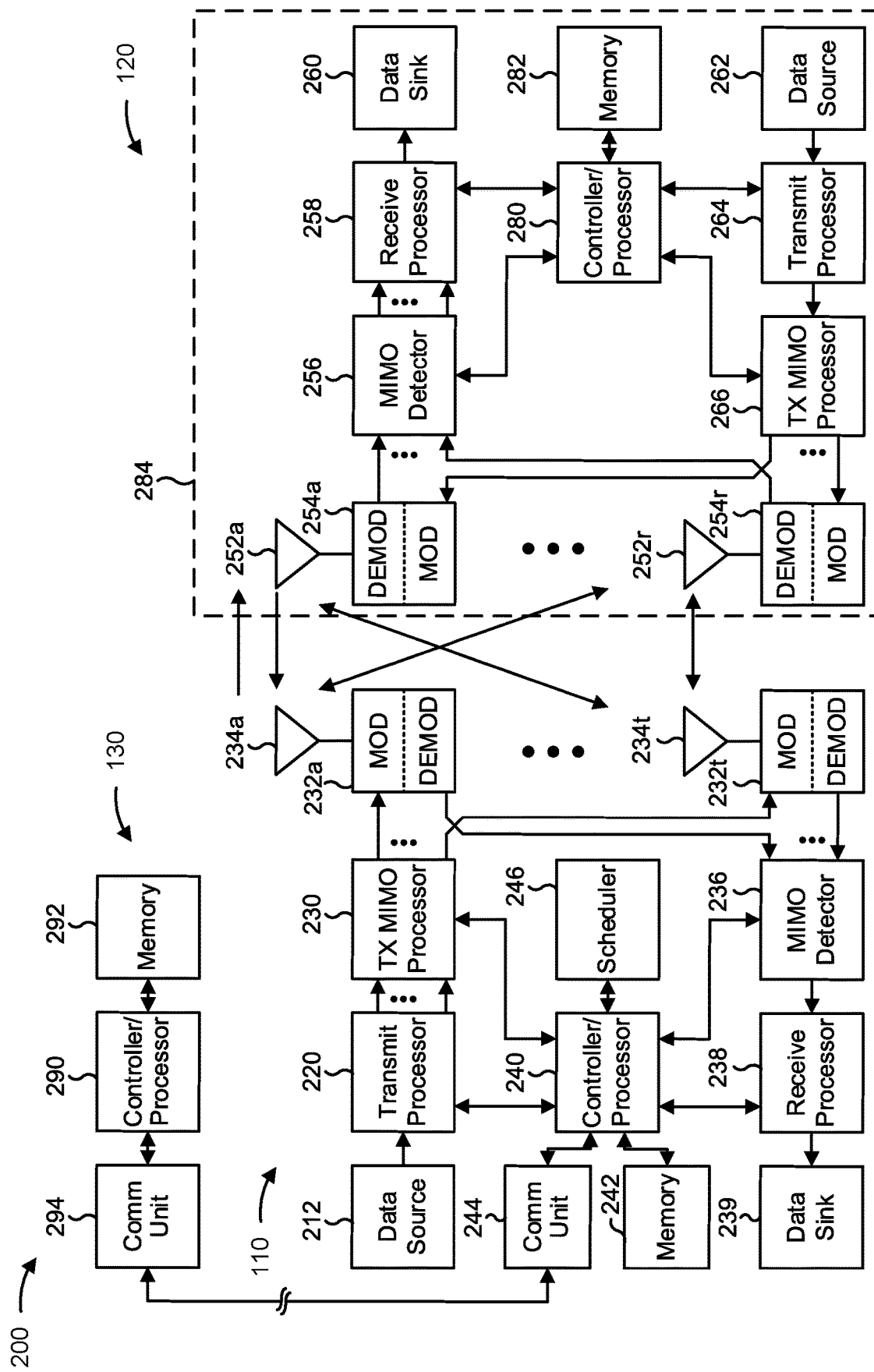
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with communicating using a relay node, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions.

In some aspects, a relay node may include means for receiving, from a first wireless node via a first wireless link, a first communication, means for generating, using a digital processing operation, a second communication based at least in part on an information of the first communication, wherein the second communication is different than the first communication, means for transmitting, to a second wireless node via a second wireless link, the second communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node may include means for receiving, from a relay node via a wireless control interface, a configuration indicating a relaying capability of the relay node, means for transmitting, to the relay node via the wireless control interface, a control configuration for a relaying operation, means for communicating, with the relay node via a wireless link associated with the wireless control interface, to perform the relaying operation in accordance with the control configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
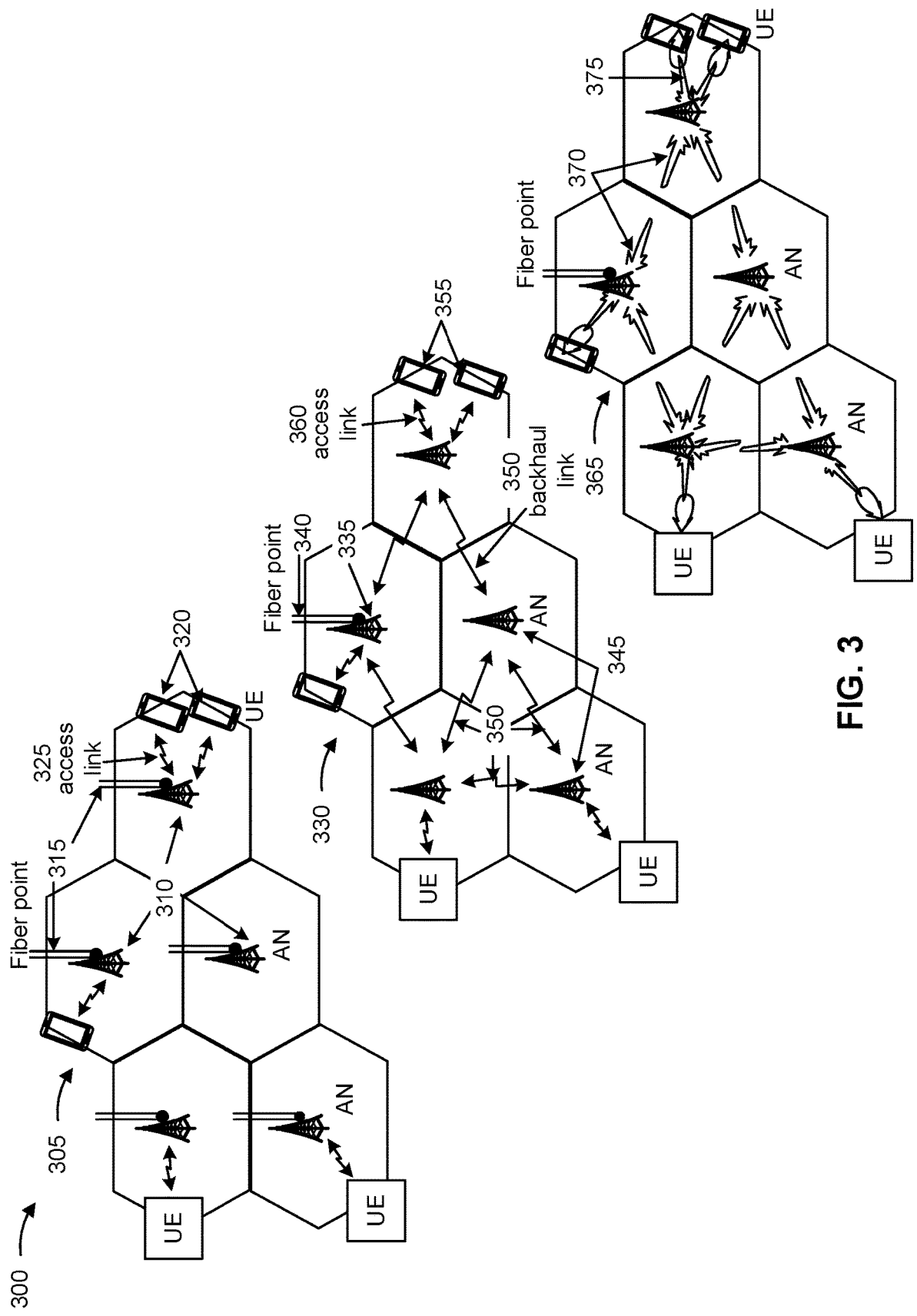
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
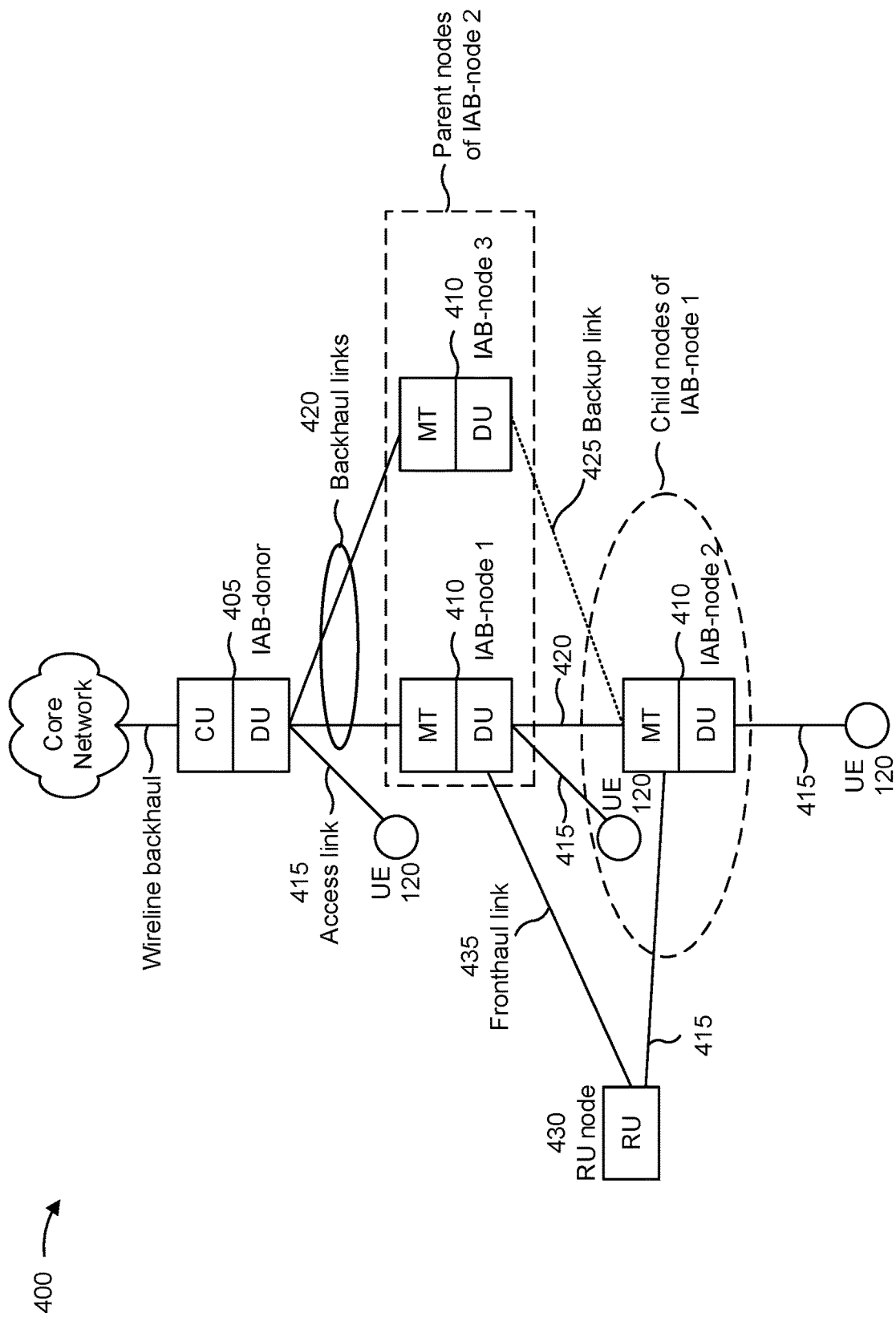
FIG. 4 is a diagram illustrating an example of an integrated access and backhaul (IAB) network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In some aspects, an IAB node 410 (e.g., a parent node) may be unable to communicate with another IAB node 410 (e.g., a child node) using a direct access link. For example, IAB-node 2 may be outside of a communication range of IAB-node 1 (e.g., an IAB-node 3), the direct access link between IAB-node 1 and IAB-node 2 may be blocked, and/or the like. IAB-node 1 utilize a remote unit (RU) node 430 (e.g., a relay node, a repeater node, and/or the like) to communicate with IAB-node 2. The IAB-node 1 (e.g., the DU of IAB-node 1) may communicate with the RU node 430 using a fronthaul link 430. For example, the IAB-node 1 may transmit a communication to the RU node 430 using the fronthaul link 435. The RU node 430 may forward the communication to the IAB-node 2 using an access link 415 between the IAB-node 2 and the RU node 430. In this way, the IAB-node 1 may extend coverage of the IAB-node 1 and communicate with the IAB-node 2 when the IAB-node 1 is unable to use a direct access link between IAB-node 1 and IAB-node 2 for direct communications.

As indicated above, FIG. 4 is provided as an example. Other examples may differ from what is described with regard to FIG. 4.

Figure 5:
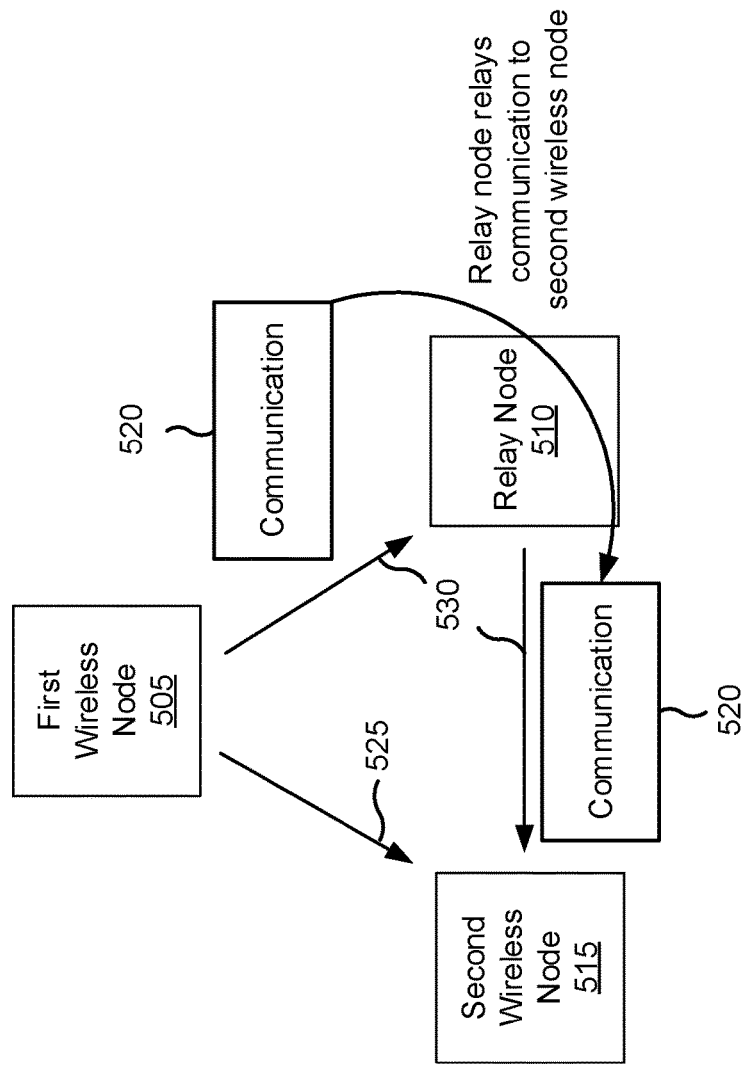
FIG. 5 is a diagram illustrating an example of a relay node that relays communications between a first wireless node and a second wireless node, in accordance with the present disclosure

FIG. 5 is a diagram illustrating an example 500 of a relay node that relays communications between a first wireless node and a second wireless node, in accordance with the present disclosure. As shown, example 500 includes a first wireless node 505 (e.g., an IAB node, an IAB donor, a base station 110, and UE 120, and/or the like), a relay node 510 (e.g., a relay device, a relay base station 110, a relay UE 120, and/or the like), and a second wireless node 515 (e.g., an IAB node, an IAB donor, a base station 110, and UE 120, and/or the like). In example 500, the first wireless node 505 and/or the second wireless node 515 may be aware of the relay node 510. In some aspects, the first wireless node 505 and/or the second wireless node 515 may be unaware of the relay node 510.

As shown in FIG. 5, the first wireless node 505 may want to transmit a communication 520 (e.g., a data communication, a control communication, and/or the like) to the second wireless node 515 using a direct link 525 (e.g., an access link) between the first wireless node 505 and the second wireless node 515. However, the first wireless node 505 may be unable to transmit the communication 520 to the second wireless node 515 using the direct link 525. For example, the second wireless node 515 may be outside of a transmit range of the first wireless node 505, the direct link 525 may be blocked, and/or the like.

Therefore, the first wireless node 505 may communicate with the second wireless node 515 using an indirect link 530. For example, the first wireless node 505 may transmit the communication 520 to the relay node 510. In some aspects, the first wireless node 505 may transmit the communication 520 directly to the relay node 510 (e.g., when the first wireless node 505 is aware of the relay node 510). In some aspects, the relay node 510 may be configured (e.g., by a control node, by the second wireless node 515, and/or the like) to receive the communication 520 from the first wireless node 505 (e.g., when the first wireless node 505 is unaware of the relay node 510).

As shown in FIG. 5, the communication 520 may pass through the relay node 510 and be relayed by the relay node 510. For example, the relay node 510 may receive the communication 520 and may generate another communication based at least in part on the communication 520. In some cases, an indirect link 530 may be an access link, a side link or a fronthaul link. For example, if the first wireless node 505 is a base station 110 and the second wireless node 515 is a UE 120, the indirect link 530 between the first wireless node 505 and the relay node 510 may be a fronthaul link. The indirect link 530 between the relay node 510 and the second wireless node 515 may be an access link. Using the communication scheme shown in FIG. 5 may improve network performance and increase reliability by providing the first wireless node 505 and/or the second wireless node 515 with link diversity for communications, by extending a communication coverage area of the first wireless node 505 and/or the second wireless node 515, and/or the like.

As indicated above, FIG. 5 is provided as an example. Other examples may differ from what is described with respect to FIG. 5.

Figure 6:
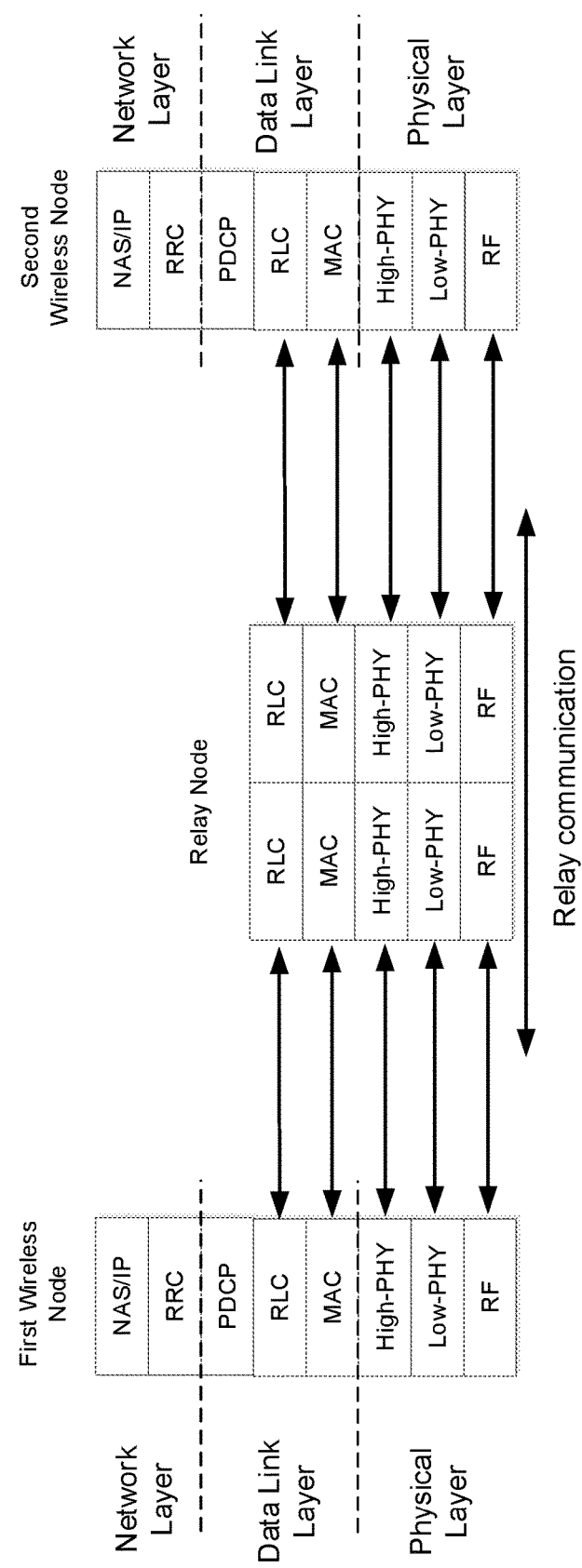
FIG. 6 is a diagram illustrating an example of a protocol stack for relaying communications between a first wireless node and second wireless node, in accordance with the present disclosure.

FIG. 6 is a diagram illustrating an example 600 of a protocol stack for relaying communications between a first wireless node and second wireless node, in accordance with the present disclosure.

As shown in FIG. 6, an NR protocol stack implemented on a first wireless node and on a second wireless node includes a network layer (e.g., Layer 3), a data link layer (e.g., Layer 2) and a physical layer (e.g., Layer 1). The network layer may include a non-access stratum (NAS) layer, an internet protocol (IP) layer, an RRC layer, and/or the like. The data link layer may include a packet data convergence protocol (PDCP) layer, a radio link control (RLC), a medium access control (MAC), and/or the like. The physical layer may include a high-physical (PHY) layer, a low-PHY layer, a radio frequency (RF) layer, and/or the like. In some aspects, the PDCP layer on a wireless node may include an adaptation sub-layer (e.g., a service data adaptation protocol (SDAP) sub-layer) and/or the like.

In some aspects, such as in an IAB network, the NAS layer, the IP layer, the RRC layer, the PDCP layer, and/or the like may be included in a CU of an IAB donor. The remaining layers (e.g., the RLC layer, the MAC layer, the high-PHY layer, the low-PHY layer, the RF layer, and/or the like) may be included in a DU of an IAB donor and/or of an IAB node.

When communicating directly with the second wireless node, the first wireless node may communicate at an RLC layer, a MAC layer, a high-PHY layer, a low-PHY layer, an RF layer, and/or the like. As shown in FIG. 6, the layers in the first wireless node may communicate with corresponding layers in the second wireless node. However, in a relay scenario, the first wireless node may communicate via a link (e.g., an access link, a fronthaul link, and/or the like) with a relay node. For example, to enable Layer 2 relaying (e.g., data link layer relaying) between the first wireless node and the second wireless node, the relay node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based at least in part on passing information between these layers, the relay node enables Layer 2 relaying between the first wireless node and the second wireless node. A relay node that performs Layer 2 relaying as described herein may be referred to as a Layer 2 relay node.

In some aspects, the relay node may utilize Layer 1 relaying (e.g., physical layer relaying). For example, the relay node may not include an RLC layer or a MAC layer. As the relay node may not include an RLC or MAC layer, the relay node may be configured and/or scheduled by a control node (e.g., a CU, an IAB donor, and IAB node, a base station 110, the first wireless node, the second wireless node, and/or the like). The relay node may communicate with the first wireless node and the second wireless node at the physical layer only (e.g., rather than the data link layer and the physical layer). Based at least in part on passing information between these layers, the relay node enables Layer 1 relaying between the first wireless node and the second wireless node. A relay node that performs Layer 1 relaying as described herein may be referred to as a Layer 1 relay node.

As indicated above, FIG. 6 is provided as an example. Other examples may differ from what is described with respect to FIG. 6.

A relay node may be a device that receives a communication, determines information associated with the communication, and generates a second communication based at least in part on the information associated with the communication. A relay node may be a Layer 2 relay device or a Layer 1 relay device. As a Layer 1 relay device may not include a MAC layer (e.g., an a MAC scheduler), the Layer 1 relay device may need to be configured, scheduled, controlled, and/or the like by a control node (e.g., a CU, a DU, a base station, an IAB node, an IAB donor, and/or the like). In some cases, communication links between the relay node and the control node may be wired links (e.g., ethernet links, and/or the like) to ensure information can be transmitted between the control node and the relay node. However, in some wireless networks, communication links between the relay node and the control node (or between the relay device and other wireless communication devices in the wireless network using the relay device to extend coverage of the wireless communication device) cannot be wired due to a distance between the different devices. For example, it may not be feasible to use wired links on a fronthaul link between the relay node and the control node or one or more other wireless nodes.

Some techniques and apparatuses described herein enable wireless communication using a relay node (e.g., a Layer 1 relay node). For example, a relay node may communicate with a control node via a wireless link to exchange control messages. The relay node may transmit a relaying capability, a status, and/or the like of the relay node to the control node. The control node may transmit a configuration to the relay node indicating how the relay node is to relay communications. The relay node may receive a communication from a first wireless node (e.g., the control node or another wireless node) via a wireless link. The relay node may generate, using digital processing, a second communication based at least in part on information included in the first communication. The relay node may transmit the second communication to a second wireless node using another wireless link. As a result, the relay node may be enabled to perform Layer 1 relaying of communications in a wireless network. Performing Layer 1 relaying in this manner may improve network performance and increase reliability by providing the wireless nodes with link diversity for communications and extending a coverage area of wireless nodes within the wireless network.

Figure 7:
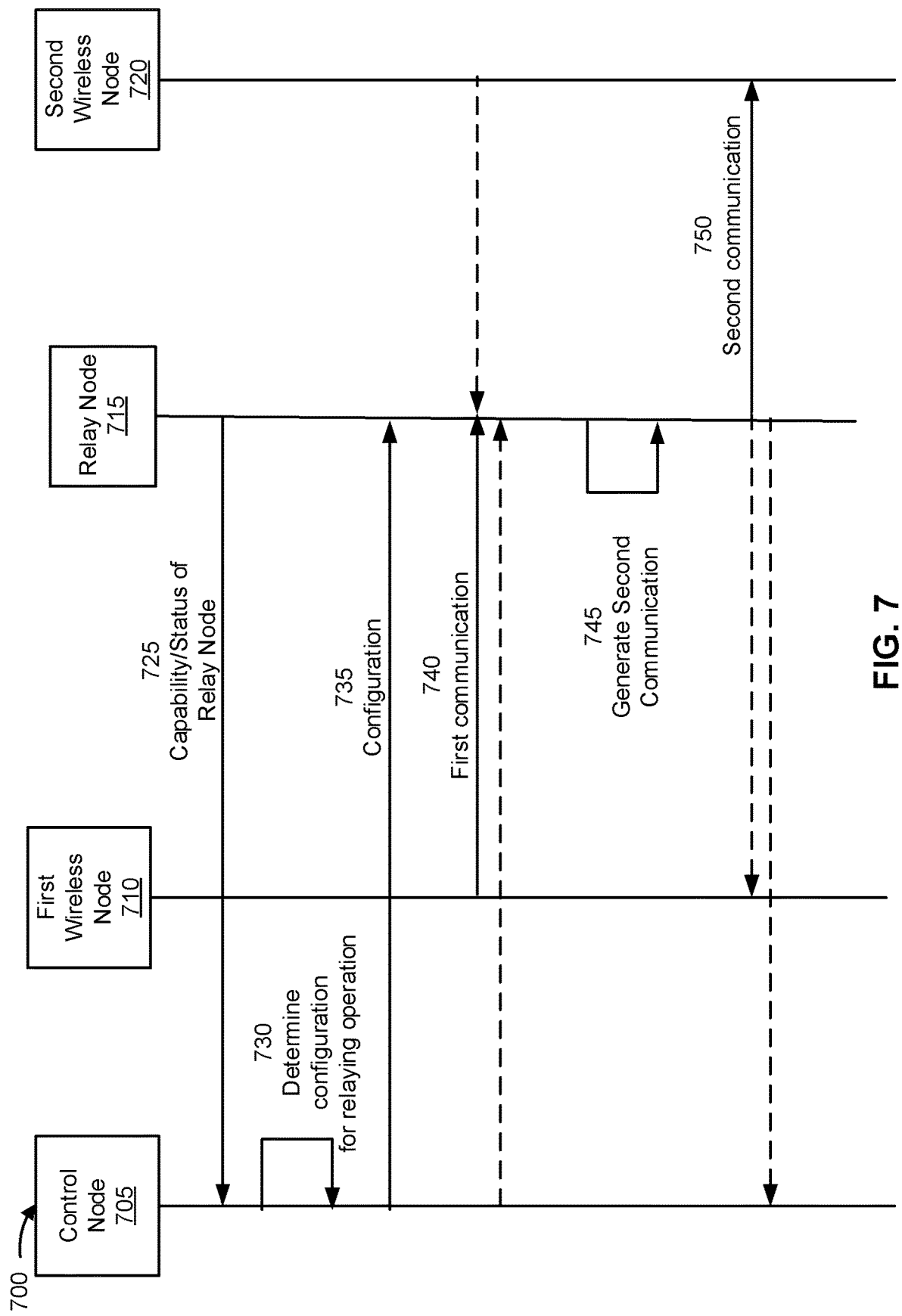
FIG. 7 is a diagram illustrating an example associated with communicating using a relay node, in accordance with the present disclosure.

FIG. 7 is a diagram illustrating an example 700 associated with communicating using a relay node, in accordance with the present disclosure. As shown in FIG. 7, a control node 705, a first wireless node 710, a relay node 715, and a second wireless node 720 may communicate with one another in a wireless network (e.g., wireless network 100). In some aspects, the control node 705 may be a base station 110, a CU of an IAB donor, a DU of an IAB node, an IAB node, and/or the like. In some aspects, the first wireless node 710 may be a base station 110, a UE 120, an IAB donor, an IAB node, another relay node 715, and/or the like. In some aspects, the relay node 715 may be a relay device, a remote unit of an IAB node, a relay station, a Layer 1 relay device, a millimeter wave relay device, a base station 110, a UE 120, an IAB node, and/or the like. In some aspects, the second wireless node 720 may be a base station 110, a UE 120, an IAB donor, an IAB node, another relay node 715, and/or the like. In some aspects, the relay node 715 may communicate with multiple first wireless devices 710. In some aspects, the relay node 715 may communicate with multiple second wireless nodes 720.

As show by reference number 725, the relay node 715 may transmit, to the control node 705, a configuration indicating a relaying capability or a status of the relay node 715. For example, the relay node 715 may establish a control interface with the control node 705. The control interface may be over a wireless fronthaul link. The relay node 715 may establish the control interface using an MT unit of the relay node 715. In some aspects, the relay node 715 may establish the control interface with the control node 705, the first wireless node 710, the second wireless node 720, and/or the like. In some aspects, the control node 705 may be the same device as the first wireless node 710 and/or the second wireless node 720 (e.g., the first wireless node 710 may also be the control node 705, the second wireless node 720 may also be the control node 705, and/or the like). In some aspects, the control node 705 may be a separate device that controls and/or configures the relay node 715.

In some aspects, the control interface may be an in-band control interface. An in-band control interface may use a same operating frequency as an operating frequency that the relay node 715 uses to transmit signals to other wireless nodes (e.g., if the relay node 715 is communicating with other wireless nodes in a 30 GHz band, the control interface may also operate in the 30 GHz band). For example, for an in-band control interface, the control interface may use a same frequency as communications between the relay node 715 and the first wireless node 710, between the relay node 715 and the second wireless node 720, and/or the like. For example, the relay node 715 (e.g., the MT unit of the relay node 715) may establish a Uu link to the control node 705 in the same frequency as links between the relay node 715 and the other wireless nodes. In some aspects, the control interface may be associated with a limited bandwidth on the operating frequency. For example, the control interface may be configured to use a bandwidth part (BWP) on the operating frequency. In some aspects, the BWP associated with the control interface may be configured by the control node 705, the relay node 715, and/or the like.

In some aspects, the control interface may be an out-of-band control interface. An out-of-band control interface may use a different operating frequency than an operating frequency that the relay node 715 uses to transmit signals to other wireless nodes. In some aspects, a frequency band associated with the control interface may be lower than a frequency band used by the relay node 715 to communicate with other wireless nodes (e.g., the first wireless node 710, the second wireless node 720, and/or the like). In some aspects, an out-of-band control interface may be associated with a different RAT than a RAT used by the relay node 715 to communicate with other wireless nodes (e.g., the first wireless node 710, the second wireless node 720, and/or the like). For example, the relay node 715 may use an NR RAT to communicate with the first wireless node 710, the second wireless node 720, and/or the like. The relay node 715 may use an LTE RAT to communicate using the control interface. For example, the MT unit of the relay node 715 may be based at least in part on an LTE NB-IoT UE 120, a reduced capability UE 120, and/or the like The configuration indicating the relaying capability or the status of the relay node 715 may indicate one or more relaying operations supported by the relay node 715 (e.g., a duplexing capability of the relay node 715, a buffer capability of the relay node 715, and/or the like), one or more digital processing operations supported by the relay node 715 (e.g., as described in more detail below with respect to FIGS. 8A and 8B), beamforming codebook information associated with a beamforming codebook stored by the relay node 715 (e.g., indicating one or more transmit beams, one or more receive beams, spatial quasi co-location information associated with the beams, a number of antenna arrays of the relay node 715, a number of antenna panels of the relay node 715, an indication of which beams are associated with which antenna arrays or antenna panels, and/or the like), a beamforming configuration capability of the relay node 715 (e.g., indicating if beamforming parameters, such as a phase setting, an amplitude setting, and/or the like, of the relay node 715 can be dynamically configured by the control node 705), a transmit power configuration of the relay node 715 (e.g., indicating a power headroom of the relay node 715, a maximum transmit power supported by the relay node 715, a maximum gain level supported by the relay node 715, a current gain setting of the relay node 715, a current transmit power setting of the relay node 715, and/or the like), a buffer status of the relay node 715 (e.g., indicating an available memory of the buffer of the relay node 715, a maximum buffer size, a buffer overflow indication, and/or the like), a conversion configuration associated with converting between analog signals and digital signals (e.g., an analog-to-digital conversion setting, a digital-to-analog conversion setting, and/or the like), an in-phase/quadrature (IQ) sample compression capability of the relay node 715, and/or the like.

As shown by reference number 730, the control node 705 may determine a control configuration for indicating control information for relaying operations to be performed by the relay node 715. The control node 705 may determine the control configuration based at least in part on the capability and/or status of the relay node 715. In some aspects, the control node 705 may determine the control configuration based at least in part on scheduling requirements of the first wireless node 710, the relay node 715, the second wireless node 720, and/or the like.

As shown by reference number 735, the relay node 715 may receive, the configuration indicating control information for relaying operations to be performed by the relay node 715. The relay node 715 may receive the configuration indicating control information for relaying operations using the control interface. In some aspects, the configuration indicating control information for relaying operations may be based at least in part on relaying operations supported by the relay node 715 (e.g., as described in more detail below with respect to FIGS. 8A and 8B). In some aspects, the configuration indicating control information for relaying operations may be based at least in part on a type of information to be processed and/or relayed by the relay node 715. For example, if a communication to be relayed by the relay node 715 is carrying (e.g., in a payload of the communication) time domain IQ samples, the control node 705 may transmit a first configuration. If the communication to be relayed by the relay node 715 is carrying frequency domain IQ samples, the control node 705 may transmit a second configuration. If the communication to be relayed by the relay node 715 is carrying IQ samples of occupied tones (e.g., OFDM symbols per antenna element), the control node 705 may transmit a third configuration. If the communication to be relayed by the relay node 715 is carrying coding information (e.g., a codeword, a received codeword, log likelihood ratio (LLR) values, and/or the like), the control node 705 may transmit a fourth configuration. If the communication to be relayed by the relay node 715 is carrying a transport block, the control node 705 may transmit a fifth configuration.

In some aspects, the control configuration indicating control information for relaying operations to be performed by the relay node 715 may indicate a receive configuration, a transmit configuration, a reporting configuration, a numerology configuration, a beamforming configuration, resource element (RE) mapping information (e.g., indicating RE indexes of occupied tones of a communication), channel estimation information (e.g., indicating information required by the relay node 715 to perform channel estimation, such as resources and configurations associated with reference signals to be used for channel estimation), modulation order information, layer mapping information, a precoding configuration, one or more scrambling identifiers, a network coding configuration (e.g., indicating a MCS, a coding technique, a coding rate, and/or a network coding scheme used by communications to be relayed by the relay node 715), and/or the like.

In some aspects, the control node 705 may transmit one or more of the above elements of the configuration dynamically (e.g., in a downlink control information communication and/or the like). For example, the control node 705 may dynamically indicate a beamforming configuration to be used by the relay node 715 for specific relaying operations, time resources to be used by the relay node 715 for specific relaying operations, resources occupied by communications that the relay node 715 is to receive and/or transmit, and/or the like. In some aspects, the control node 705 may transmit one or more of the above elements of the configuration semi-statically (e.g., using MAC signaling, and/or the like). In some aspects, the control node 705 may transmit one or more of the above elements of the configuration using RRC signaling, and/or the like.

In some aspects, the configuration indicating control information for relaying operations to be performed by the relay node 715 may indicate one or more of the above elements. For example, the configuration may indicate a receive configuration, a transmit configuration, and a reporting configuration. In some aspects, the configuration may indicate the receive configuration, the transmit configuration, the reporting configuration, and the numerology configuration. In some aspects, the configuration may indicate the receive configuration, the transmit configuration, the reporting configuration, the numerology configuration, the beamforming configuration, and the RE mapping information. In some aspects, the configuration may indicate the receive configuration, the transmit configuration, the reporting configuration, the numerology configuration, the beamforming configuration, the RE mapping information the channel estimation information, the modulation order information, the layer mapping information, and the precoding configuration. In some aspects, the configuration may indicate the receive configuration, the transmit configuration, the reporting configuration, the numerology configuration, the beamforming configuration, the RE mapping information the channel estimation information, the modulation order information, the layer mapping information, the precoding configuration, the one or more scrambling identifiers, and the network coding configuration.

In some aspects, the receive configuration may indicate a receive analog beamforming configuration, a time domain resource allocation associated with receiving one or more signals, receive frequency information (e.g., indicating a center frequency and a bandwidth associated with receive communications, such as uplink communications), an analog-to-digital conversion (ADC) configuration (e.g., indicating an ADC resolution, and/or an ADC sample rate), an IQ sample compression setting, and/or the like.

In some aspects, the transmit configuration may indicate a transmit analog beamforming configuration, a time domain resource allocation associated with transmitting downlink communications, a transmit power setting, a transmit amplification setting, a transmit center frequency, an IQ sample decompression setting, and/or the like.

In some aspects, the reporting configuration may indicate a request (e.g., from the control node 705, the first wireless node 710, and second wireless node 720, and/or the like) for a buffer status of the relay node 715, a power status of the relay node 715 (e.g., a power headroom), a measurement report indicating measurements performed by the relay node 715, one or more relaying capabilities of the relay node 715, one or more current configurations at the relay node 715, and/or the like.

In some aspects, the numerology configuration may indicate a cyclic prefix (CP) size to be used by the relay node 715, a subcarrier spacing (SCS) size to be used by the relay node 715, a fast Fourier transform (FFT) size to be used by the relay node 715, and/or the like. In some aspects, the configuration from the control node 705 may include a numerology configuration for downlink communications to be relayed by the relay node 715, a numerology configuration for uplink communications to be relayed by the relay node 715, and/or the like.

In some aspects, the beamforming configuration may indicate a beam index to a beamforming codebook that has been trained and/or configured at the relay node 715 (e.g., a beamforming codebook stored by the relay node 715). For example, the relay node 715 may perform a beamforming process (e.g., a beam selection process, a beam refinement process, a beam search process, and/or the like) to form and identify different beams available for the relay node 715 to use. The beamforming configuration may indicate a beam, from the different beams available for the relay node 715, that the relay node 715 is to use for an upcoming relaying operation.

In some aspects, the beamforming configuration may indicate phase setting, amplitude settings, and/or the like for certain antenna elements of the relay node 715. That is, the control node 705 may dynamically select different beamforming parameters that the relay node 715 is to use for an upcoming relaying operation. In some aspects, the control node may use a beamforming configuration in this manner based at least in part on an indication from the relay node 715 that the relay node is capable of supporting this type of beamforming.

In some aspects, if the control interface between the control node 705 and the relay node 715 is an in-band control interface, the control node 705 may use downlink control information (DCI) signaling, MAC-control element (MAC-CE) signaling, RRC signaling, and/or the like to transmit the configuration to the relay node 715. In some aspects, if the control interface between the control node 705 and the relay node 715 is an out-of-band control interface, the control node 705 may use lower layer signaling (e.g., Layer 1 signaling, physical layer signaling, and/or the like), upper layer signaling (e.g., Layer 2 signaling, data link layer signaling, and/or the like), application layer signaling (e.g., Layer 3 signaling, IP signaling), and/or the like.

As shown by reference number 740, the first wireless node 710 may transmit a first communication to the relay node 715. In some aspects, the first wireless node 710 may transmit the first communication to the relay node 715 directly (e.g., if the first wireless node 710 is aware of the relay node 715). In some aspects, the first wireless node 710 may transmit the first communication to the relay node 715 indirectly (e.g., if the first wireless node 710 is unaware of the relay node 715). For example, the first communication may be intended for the second wireless node 720. However, the second wireless node 720 may be outside of a communication range of the first wireless node 710. Therefore, the relay node 715 may be configured (e.g., by the control node 705 as described above, by the second wireless node 720, and/or the like) to receive the first communication so that the relay node 715 may perform a relaying operation by relaying the first communication to the second wireless node 720 (e.g., as described in more detail below).

Alternatively, the control node 705 may transmit the first communication to the relay node 715 (e.g., as shown by the dashed line in FIG. 7). Alternatively, the second wireless node 720 may transmit the first communication to the relay node 715 (e.g., as shown by the dashed line in FIG. 7).

In some aspects, the first wireless node 710 may transmit the first communication via a wireless fronthaul link (e.g., if the first wireless node 710 is aware of the relay node 715, if the first wireless node 710 is a base station 110, if the first wireless node 710 includes a DU, and/or the like). In some aspects, the first wireless node 710 may transmit the first communication via a wireless access link (e.g., if the first wireless node 710 is unaware of the relay node 715, if the first wireless node 710 is a UE 120, if the first wireless node 710 includes an MT unit, and/or the like). In some aspects, the first communication may be a downlink communication (e.g., a downlink data communication, a downlink control communication, and/or the like). In some aspects, the first communication may be an uplink communication (e.g., an uplink data communication, an uplink control communication, and/or the like).

In some aspects, the first communication may include a control communication and a data communication. For example, the first communication may include a control communication that schedules a subsequent data communication. The first wireless node 710 may transmit a control communication using a control plane of the link between the first wireless node 710 and the relay node 715. The first wireless node 710 may transmit a data communication using a data plane of the link between the first wireless node 710 and the relay node 715.

In some aspects, the relay node 715 may be associated with one or more fronthaul links (e.g., between the relay node 715 and another wireless node, such as a DU of an IAB node, a base station 110, and/or the like) and one or more access links (e.g., between the relay node 715 and another wireless node, such as an MT unit of an IAB node, a UE 120, and/or the like). For example, the link between the first wireless node 710 and the relay node 715 may be a fronthaul link and the link between the second wireless node 720 and the relay node 715 may be an access link. In some aspects, a data plane operating frequency of the fronthaul link and a data plane operating frequency of the access link may be the same (e.g., the fronthaul link and the access link may use a same frequency band). In some aspects, the data plane operating frequency of the fronthaul link and the data plane operating frequency of the access link may be different (e.g., the fronthaul link may be associated with a higher frequency band than a frequency band associated with the access link).

For example, in some aspects, the second wireless node 720 may be served by the first wireless node 710 (or another wireless node) at a first frequency band. The first wireless node 710 may utilize the relay node 715 to relay communications between the first wireless node 710 and the second wireless node 720. The first wireless node 710 may communicate with the relay node 715 at a different frequency band than the frequency band used to serve the second wireless node 720.

The first communication may include information associated with a relaying operation to be performed by the relay node 715. For example, the first communication may include a payload that includes information to be transmitted to the second wireless node 720. In some aspects, the first communication may indicate information that is to be included in a payload of a communication transmitted to the second wireless node 720. In some aspects, the first communication may indicate resources (e.g., time-frequency resources) to be used by the relay node 715 to transmit a communication to the second wireless node 720. In some aspects, the first communication may indicate resources (e.g., time-frequency resources) to be used by the relay node 715 to receive a communication from the second wireless node 720 that is to be relayed to the first wireless node 710. In some aspects, the first communication may include a configuration that is similar to the configuration transmitted by the control node 705, described above (e.g., the first communication may include the configuration, the first communication may update or supplement the configuration, the first communication may indicate one or more elements of the configuration, and/or the like).

For example, the first communication may include a payload of one or more time domain IQ samples associated with a communication to be transmitted to the second wireless node 720, one or more frequency domain IQ samples associated with the communication to be transmitted to the second wireless node 720, one or more IQ samples of occupied tones associated with the communication to be transmitted to the second wireless node 720, a codeword associated with the communication to be transmitted to the second wireless node 720, a transport block associated with the communication to be transmitted to the second wireless node 720, a reference signal associated with the communication to be transmitted to the second wireless node 720, or one or more parameters to generate a reference signal associated with the communication to be transmitted to the second wireless node 720.

In some aspects, the first communication may include a payload that indicates transmit configuration information associated with transmitting the communication that is to be transmitted to the second wireless node 720. The transmit configuration information may include a resource allocation for the communication that is to be transmitted to the second wireless node 720, a beamforming configuration for the communication that is to be transmitted to the second wireless node 720, a transmit power control configuration for the communication that is to be transmitted to the second wireless node 720, and/or the like.

In some aspects, the relay node 715 may receive the first communication based at least in part on the configuration transmitted by the control node 705. For example, the configuration may indicate a beamforming configuration for receiving the first communication, a resource allocation for receiving the first communication, and/or the like.

In some aspects, prior to receiving the first communication, the relay node 715 may receive a communication from the second wireless node 720 indicating information associated with receiving the first communication. For example, if the first wireless node 710 is unaware of the relay node 715, the second wireless node 720 may configure the relay node 715 to receive the first communication and relay the first communication to the second wireless node 720. The information associated with receiving the first communication may include a beamforming configuration, a resource allocation, and/or the like.

In some aspects, the communication from the second wireless node 720 indicating information associated with receiving the first communication may indicate a scheduling grant for the first wireless node 710 to transmit the first communication. The relay node 715 may generate another communication indicating the scheduling grant and transmit the other communication to the first wireless node 710. The first wireless node 710 may transmit the first communication based at least in part on receiving the scheduling grant from the relay node 715.

As shown by reference number 745, the relay node 715 may generate a second communication that is to be transmitted to the second wireless node 720. For example, the relay node 715 may generate the second communication using a digital processing operation. The digital processing operation is explained in more detail below with respect to FIGS. 8A and 8B.

The relay node 715 may generate the second communication based at least in part on an information associated with the first communication (e.g., a payload of the first communication and/or the like). For example, the relay node 715 may decode the first communication to determine information associated with the first communication. In some aspects, a payload of the first communication may indicate IQ samples (e.g., time domain IQ samples, frequency domain IQ samples, and/or the like). The relay node 715 may generate the second communication using the IQ samples indicated in the first communication.

In some aspects, the relay node 715 may generate the second communication to indicate information about the first communication (e.g., information acquired from the first communication). For example, the relay node 715 may be configured to digitally process the first communication to identify IQ samples associated with the first communication. The relay node 715 may generate the second communication such that an information (e.g., a payload) of the second communication indicates the identified IQ samples of the first communication. As a result, the generated second communication may be different than the first communication but may be associated with the first communication.

As shown by reference number 750, the relay node 715 may transmit the second communication to the second wireless node 720. The relay node 715 may transmit the second communication using an access link (e.g., if the second wireless node 720 is an MT unit of an IAB node, a UE 120, another relay node 715, and/or the like). In some aspects, the relay node 715 may transmit the second communication using a fronthaul link (e.g., if the second wireless node 720 is a DU of an IAB node, a base station 110, and/or the like). In some aspects, the second communication may be a downlink communication. In some aspects, the second communication may be an uplink communication. Alternatively, the relay node 715 may transmit the second communication to the first wireless node 710 and/or the control node 705 (e.g., as shown by the dashed lines in FIG. 7).

In some aspects, the relay node 715 may transmit the second communication using a same operating frequency as an operating frequency used to receive the first communication. In some aspects, the relay node 715 may transmit the second communication using a different operating frequency than an operating frequency used to receive the first communication. For example, if the first communication is transmitted over a fronthaul link, the relay node 715 may transmit (e.g., on an access link the second communication using a lower operating frequency than an operating frequency used to receive the first communication). If the first communication is transmitted over an access link, the relay node 715 may transmit the second communication (e.g., on a fronthaul link) using a higher operating frequency than an operating frequency used to receive the first communication.

In this way, the relay node 715 may perform a Layer 1 relaying operation that includes receiving the first communication from the first wireless node 710 (e.g., as described above with respect to reference number 740), generating the second communication based at least in part on information associated with the first communication (e.g., as described above with respect to reference number 745), and transmitting the second communication to the second wireless node (as described above with respect to reference number 750). As a result, the relay node 715 may be enabled to perform Layer 1 relaying of communications in a wireless network. Performing Layer 1 relaying in this manner may improve network performance and increase reliability by providing the wireless nodes with link diversity for communications and extending a coverage area of wireless nodes within the wireless network.

As indicated above, FIG. 7 is provided as an example. Other examples may differ from what is described with respect to FIG. 7.

Figure 8A:
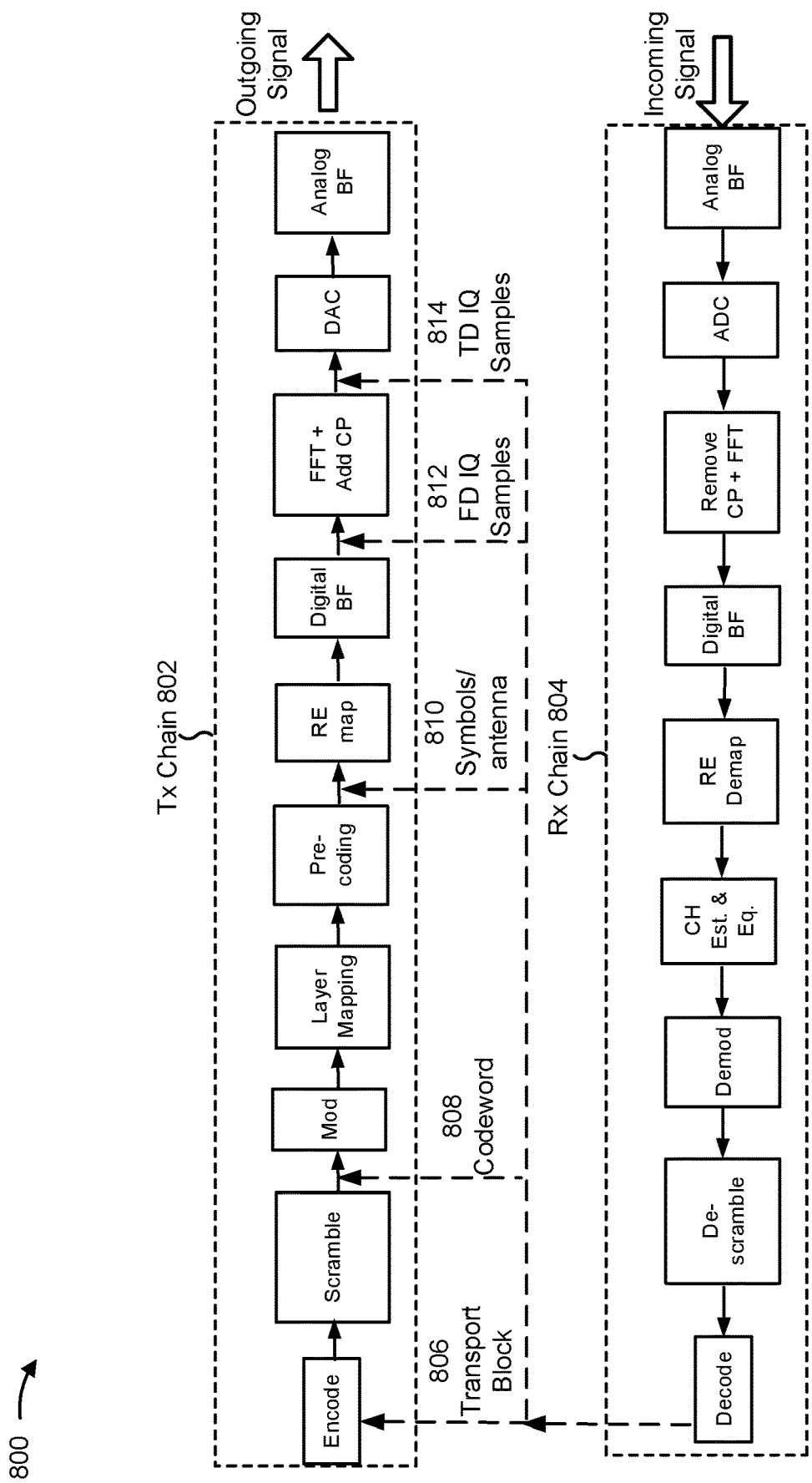
FIGS. 8A and 8B are diagrams illustrating examples of transmit (Tx) and receive (Rx) chains of a Layer 1 relay node, in accordance with the present disclosure.
Figure 8B:
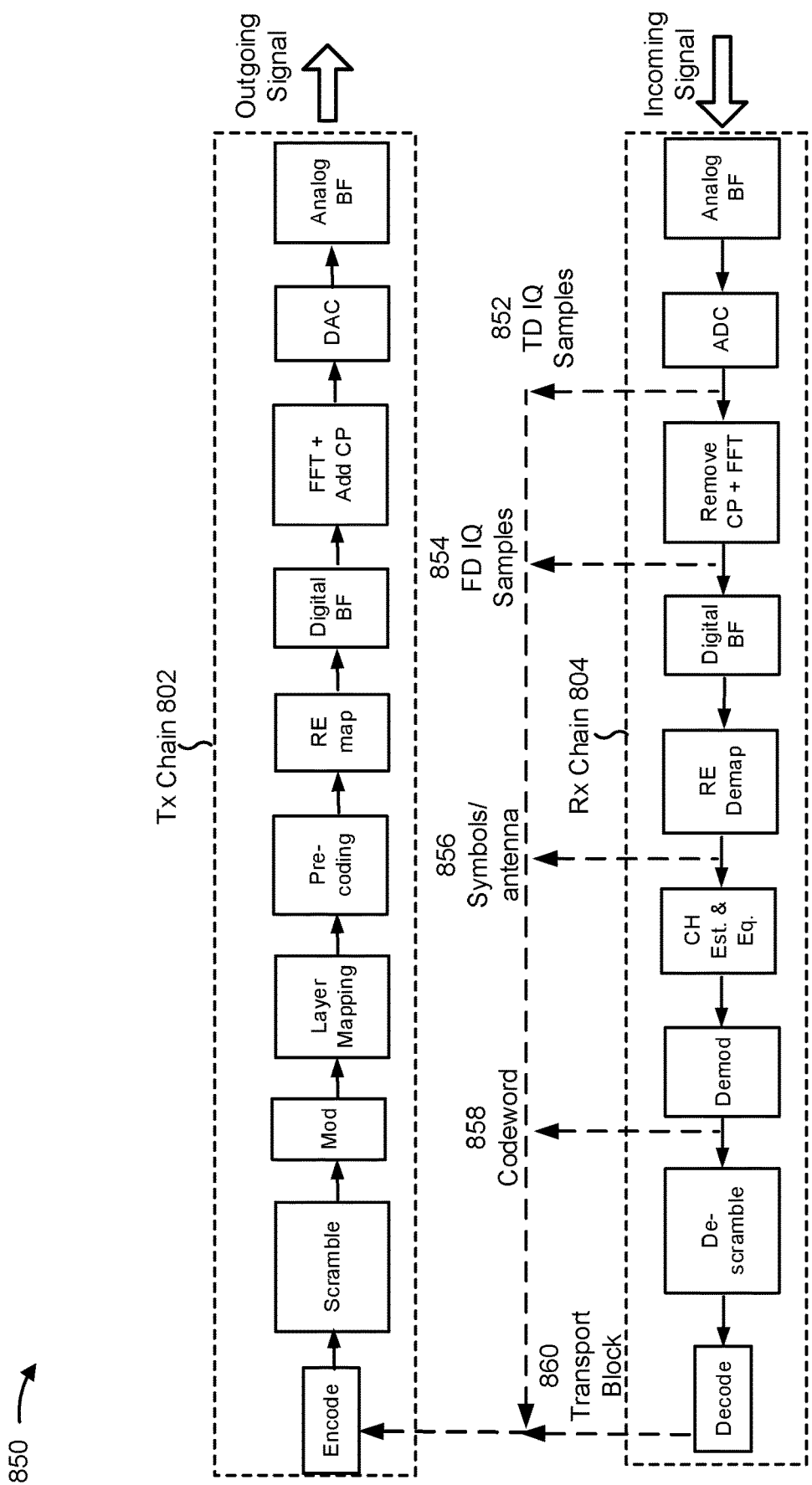

FIGS. 8A and 8B are diagrams illustrating examples 800 and 850 of transmit (Tx) and receive (Rx) chains of a Layer 1 relay node, in accordance with the present disclosure.

In some aspects, one or more components of Tx chain 802 may be implemented in transmit processor 264, TX MIMO processor 266, MOD/DEMOD 254, controller/processor 280, and/or the like, as described above in connection with FIG. 2. In some aspects, Tx chain 802 may be implemented in a relay node (e.g., relay node 715 and/or the like) for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 804 may be implemented in receive processor 258, MIMO detector 256, MOD/DEMOD 254, controller/processor 280, and/or the like, as described above in connection with FIG. 2. In some aspects, Rx chain 804 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 8A and example 800, the incoming signal may be received by the relay node over a fronthaul link. For example, the incoming signal may be downlink information received from a DU of an IAB node, a base station 110, and/or the like. As shown in FIG. 8A, the incoming signal may be processed by the Rx chain 804. For example, the relay node may fully decode the incoming signal to determine an information (e.g., a payload) carried by the incoming signal. The relay node may perform analog beamforming on the incoming signal. The relay node may convert the incoming signal from the analog domain to the digital domain using an ADC converter. The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 802. An amount or level of processing performed by the relay node associated with the Tx chain 802 may be based at least in part on the information carried by the incoming signal, a configuration received by the relay node (e.g., from a control node and/or the like), and/or the like.

As shown by reference number 806, if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying a FFT and/or adding a CP, converting the signal from the digital domain to the analog domain with a digital-to-analog converter (DAC), performing analog beamforming, and transmitting the outgoing signal).

As shown by reference number 808, if the incoming signal is carrying a codeword, the relay node may not perform encoding or scrambling to generate the outgoing signal. That is, the relay node may modulate the codeword, perform layer mapping, perform pre-coding, perform digital Rx beamforming, apply a FFT and/or add a CP, convert the signal from the digital domain to the analog domain with a DAC, perform analog beamforming, and transmit the outgoing signal.

As shown by reference number 810, if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 812, if the incoming signal is carrying frequency domain IQ samples, the relay node may not be encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 814, if the incoming signal is carrying time domain IQ samples, the relay node may not be encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal based at least in part on the information carried by the incoming signal.

As shown in FIG. 8B and example 850, the incoming signal may be received by the relay node over an access link. For example, the incoming signal may be uplink information received from an MT unit of an IAB node, a UE 120, and/or the like. In some aspects, the device transmitting the incoming signal may be unaware of the relay node.

The relay node may perform different levels of digital processing to determine information associated with the incoming signal. The level of processing may be based at least in part on a configuration received by the relay node (e.g., from a control node and/or the like). For example, as shown by reference number 852, the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 854, the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 856, the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 858, the relay node may process the incoming signal to determine a received codeword (e.g., LLR values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 860, the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about the incoming signal based at least in part on the level of processing performed by the relay node.

The number and arrangement of components shown in FIGS. 8A and 8B are provided as an example. In practice, there may be additional components, fewer components, different components, or differently arranged components than those shown in FIGS. 8A and 8B. Furthermore, two or more components shown in FIGS. 8A and/or 8B may be implemented within a single component, or a single component shown in FIGS. 8A and/or 8B may be implemented as multiple, distributed components. Additionally, or alternatively, a set of components (e.g., one or more components) shown in FIGS. 8A and/or 8B may perform one or more functions described as being performed by another set of components shown in FIGS. 8A and/or 8B.

Figure 9:
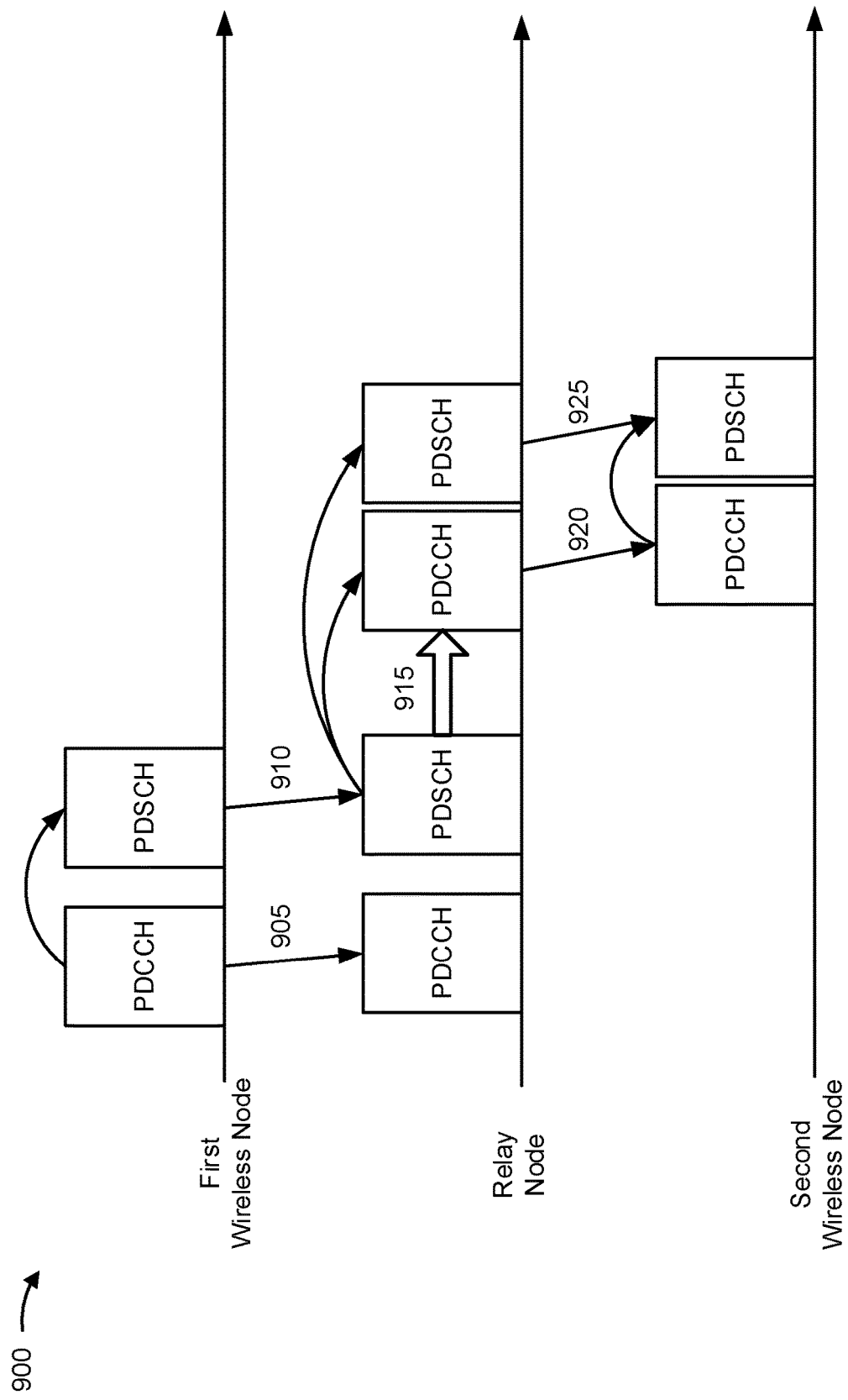
FIG. 9 is a diagram illustrating an example of a Layer 1 relaying operation, in accordance with the present disclosure.

FIG. 9 is a diagram illustrating an example 900 of a Layer 1 relaying operation, in accordance with the present disclosure. As shown in FIG. 9, a first wireless node may utilize a relay node (e.g., relay node 715 and/or the like) for relaying communication to a second wireless node. In some aspects, the first wireless node may be a DU of an IAB node, a base station 110, the first wireless node 710, and/or the like. The second wireless node may be an MT unit of an IAB node, a UE 120, the second wireless node 720, and/or the like.

In some aspects, the first wireless node may be aware of the relay node and the second wireless node may be unaware of the relay node. In some aspects, both the first wireless node and the second wireless node may be aware of the relay node. In some aspects, the first wireless node and the second wireless node may be unaware of the relay node.

Example 900 may be an example of a relaying operation involving a downlink communication. For example, the first wireless node may determine it is to send a PDSCH communication to the second wireless node. However, the first wireless node may determine that the second wireless node is outside of a communication range of the first wireless node. Therefore, the first wireless node may utilize the relay node to transmit the PDSCH communication to the second wireless node.

As shown by reference number 905, the first wireless node may transmit a PDCCH communication to the relay node. The PDCCH communication may be a fronthaul PDCCH communication (e.g., a PDCCH communication sent using a fronthaul link). The PDCCH communication may schedule a PDSCH communication (e.g., a fronthaul PDSCH communication) that is to be transmitted to the relay node.

As shown by reference number 910, the first wireless node may transmit the PDSCH communication to the relay node that was scheduled by the PDCCH communication. The PDSCH communication may include information for generating a communication to be transmitted to the second wireless node by the relay node (e.g., IQ samples, codewords, and/or the like). The PDSCH communication may include a configuration indicating how the relay node is to transmit the generated communication to the second wireless node (e.g., time domain resources, frequency domain resource, a beamforming configuration, and/or the like).

As shown by reference number 915, the relay node may generate a PDCCH communication and a PDSCH communication based at least in part on receiving the PDSCH communication from the first wireless node (e.g., as described above with respect to FIG. 8A). The generated PDCCH communication may schedule the generated PDSCH communication to be transmitted by the relay node. As shown by reference number 920, the relay node may transmit the generated PDCCH communication to the second wireless node that schedules the generated PDSCH communication. As shown by reference number 925, the relay node may transmit the generated PDSCH communication to the second wireless node. The relay node may transmit the generated PDCCH communication and the generated PDSCH communication to the second wireless node using an access link.

As indicated above, FIG. 9 is provided as an example. Other examples may differ from what is described with respect to FIG. 9.

Figure 10:
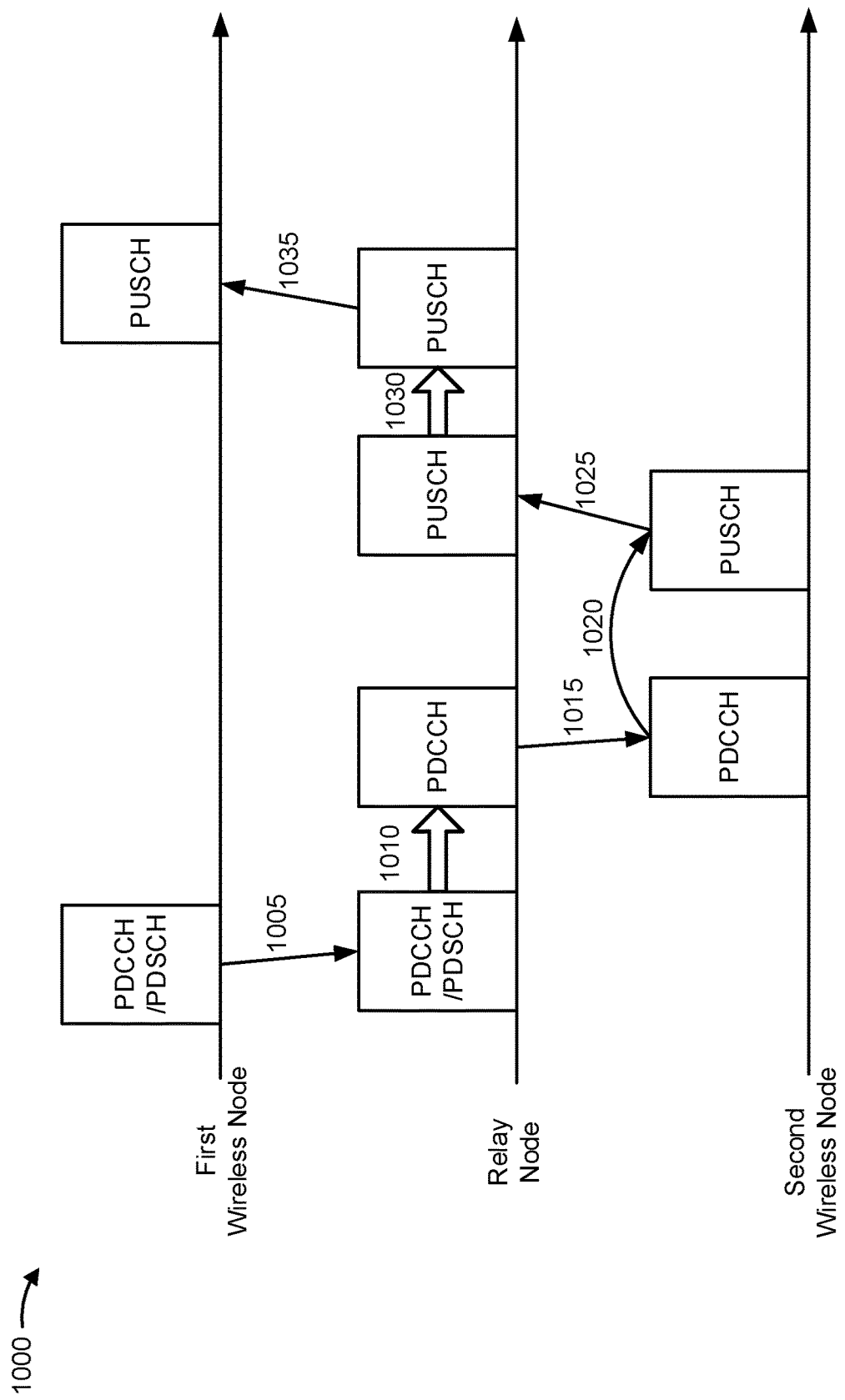
FIG. 10 is a diagram illustrating an example of a Layer 1 relaying operation, in accordance with the present disclosure.

FIG. 10 is a diagram illustrating an example 1000 of a Layer 1 relaying operation, in accordance with the present disclosure.

As shown in FIG. 10, a first wireless node may utilize a relay node (e.g., relay node 715 and/or the like) for relaying communications between the first wireless node and a second wireless node. In some aspects, the first wireless node may be a DU of an IAB node, a base station 110, the first wireless node 710, and/or the like. The second wireless node may be an MT unit of an IAB node, a UE 120, the second wireless node 720, and/or the like.

In some aspects, the first wireless node may be aware of the relay node and the second wireless node may be unaware of the relay node. In some aspects, both the first wireless node and the second wireless node may be aware of the relay node. In some aspects, the first wireless node and the second wireless node may be unaware of the relay node.

Example 1000 may be an example of a relaying operation involving an uplink communication. For example, the second wireless node may have an uplink communication to transmit to the first wireless node. However, the first wireless node may be outside of a communication range of the second wireless node. As a result, the first wireless node (or a control node) may configure the relay node to relay the uplink communication from the second wireless node to the first wireless node.

As shown by reference number 1005, the first wireless node may transmit a downlink communication (e.g., a PDCCH communication, a PDSCH communication, and/or the like) to the relay node. In some aspects, the downlink communication may include a content of a PDCCH communication to be transmitted to the second wireless node (e.g., a scheduling grant, a resource allocation for an uplink transmission, and/or the like). The downlink communication may include a configuration indicating how the relay node is to transmit a generated PDCCH communication to the second wireless node (e.g., a resource allocation, a beamforming configuration, and/or the like). In some aspects, the downlink communication may include a configuration indicating how the relay node is to receive the uplink communication from the second wireless node (e.g., a resource allocation, a beamforming configuration, and/or the like).

As shown by reference number 1010, the relay node may generate a PDCCH communication to transmit to the second wireless node to schedule an uplink communication. The PDCCH communication may be generated by the relay node based at least in part on information included in the downlink communication from the first wireless node. In some aspects, the relay node may not generate a PDCCH communication (e.g., if the uplink communication is semi-static, periodic, or pre-configured uplink transmission that is not scheduled by a PDCCH communication). In that case, the downlink configuration may only indicate how the relay node is to receive the uplink communication from the second wireless node, how the relay node is to generate another uplink communication based at least in part on the uplink communication from the second wireless node, and how the relay node is to transmit the generated uplink communication to the first wireless node.

As shown by reference number 1015, the relay node may transmit the generated PDCCH communication to the second wireless node. The relay node may transmit the generated PDCCH communication using an access link. As shown by reference number 1020, the generated PDCCH communication may schedule an uplink communication (e.g., a physical uplink shared channel (PUSCH) communication and/or the like) to be transmitted by the second wireless node.

As shown by reference number 1025, the second wireless node may transmit the PUSCH communication. In some aspects, the second wireless node may not transmit the PUSCH communication to the relay node (e.g., the second wireless node may be unaware of the relay node and may simply be attempting to transmit the PUSCH communication to the first wireless node). The relay node may receive the PUSCH communication based at least in part on the configuration indicated by the first wireless node. In some aspects, the second wireless node may transmit uplink control information (e.g., a PUCCH communication).

As shown by reference number 1030, the relay node may generate a PUSCH communication based at least in part on the uplink communication (e.g., PUSCH communication or PUCCH communication) received from the second wireless node (e.g., as described above with respect to FIG. 8B). As shown by reference number 1035, the relay node may transmit the generated PUSCH communication to the first wireless node. The relay node may transmit the generated PUSCH communication to the first wireless node using a fronthaul link.

As indicated above, FIG. 10 is provided as an example. Other examples may differ from what is described with respect to FIG. 10.

Figure 11:
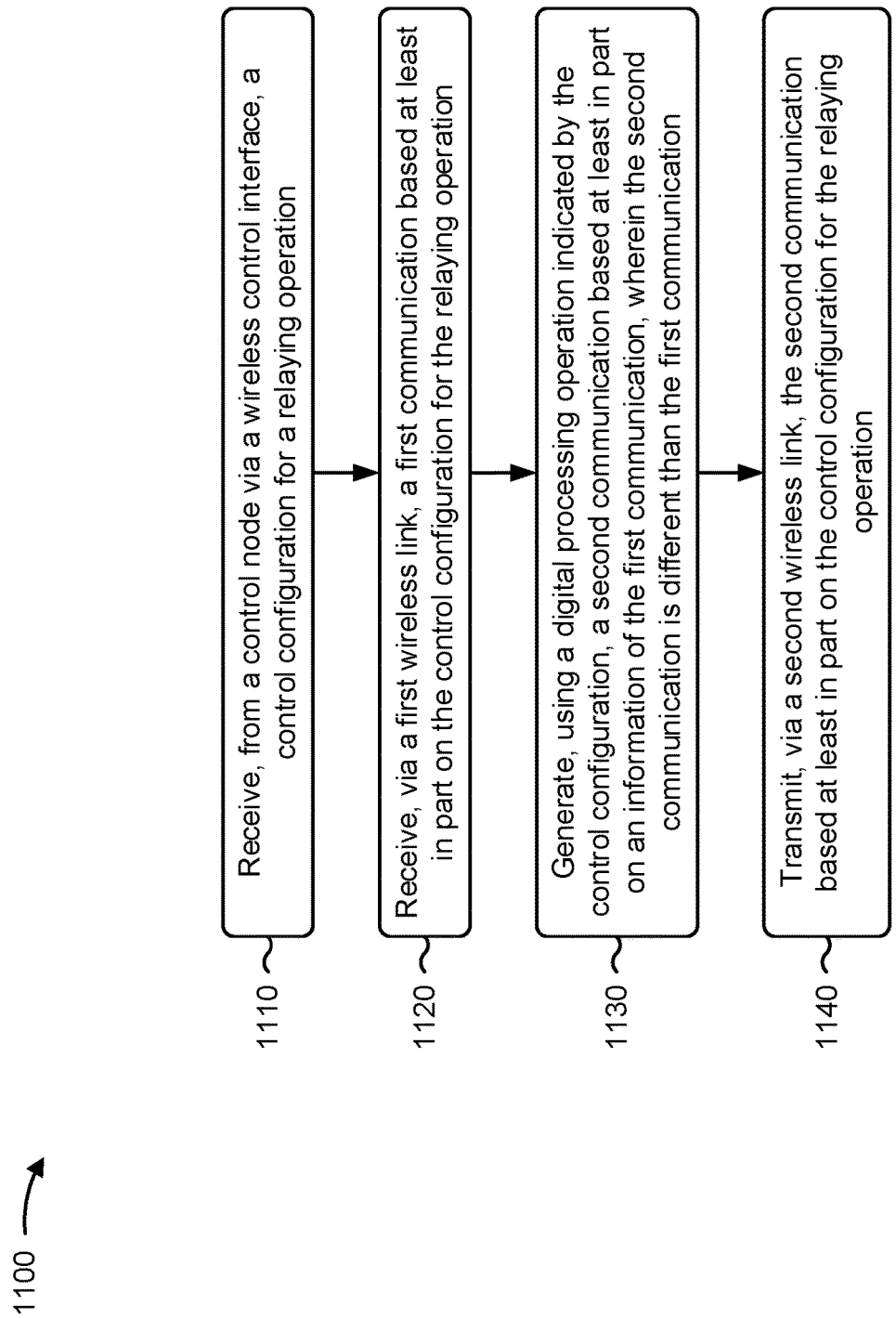
FIGS. 11 and 12 are diagrams illustrating example processes associated with communicating using a relay node, in accordance with the present disclosure.

FIG. 11 is a diagram illustrating an example process 1100 performed, for example, by a relay node, in accordance with the present disclosure. Example process 1100 is an example where the relay node (e.g., relay node RU node 430, relay node 510, relay node 715, an IAB node, a UE 120, a base station 110, and/or the like) performs operations associated with techniques for communicating using a relay node.

As shown in FIG. 11, in some aspects, process 1100 may include receiving, from a control node via a wireless control interface, a control configuration for a relaying operation (block 1110). For example, the relay node (e.g., using reception component 1302 depicted in FIG. 13) may receive, from a control node via a wireless control interface, a control configuration for a relaying operation, as described above.

As further shown in FIG. 11, in some aspects, process 1100 may include receiving, via a first wireless link, a first communication based at least in part on the control configuration for the relaying operation (block 1120). For example, the relay node (e.g., using reception component 1302 depicted in FIG. 13) may receive, via a first wireless link, a first communication based at least in part on the control configuration for the relaying operation, as described above.

As further shown in FIG. 11, in some aspects, process 1100 may include generating, using a digital processing operation indicated by the control configuration, a second communication based at least in part on an information of the first communication, wherein the second communication is different than the first communication (block 1130). For example, the relay node (e.g., using signal generation component 1308 depicted in FIG. 13) may generate, using a digital processing operation indicated by the control configuration, a second communication based at least in part on an information of the first communication, wherein the second communication is different than the first communication, as described above.

As further shown in FIG. 11, in some aspects, process 1100 may include transmitting, via a second wireless link, the second communication based at least in part on the control configuration for the relaying operation (block 1140). For example, the relay node (e.g., using transmission component 1304 depicted in FIG. 13) may transmit, via a second wireless link, the second communication based at least in part on the control configuration for the relaying operation, as described above.

Process 1100 may include additional aspects, such as any single aspect or any combination of aspects described below and/or in connection with one or more other processes described elsewhere herein.

In a first aspect, the first wireless link is a wireless fronthaul link and the second wireless link is a wireless access link, and wherein the first communication is a downlink communication and the second communication is a downlink communication.

In a second aspect, alone or in combination with the first aspect, receiving, via the first wireless link, the first communication, comprises decoding (e.g., using reception component 1302 depicted in FIG. 13) the first communication, and determining (e.g., using reception component 1302 depicted in FIG. 13) the information of the first communication based at least in part on decoding the first communication.

In a third aspect, alone or in combination with one or more of the first and second aspects, the information of the first communication comprises at least one of one or more time domain IQ samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

In a fourth aspect, alone or in combination with one or more of the first through third aspects, receiving, via the first wireless link, the first communication, comprises receiving (e.g., using reception component 1302 depicted in FIG. 13) the first communication using a first operating frequency, and transmitting, via the second wireless link, the second communication, comprises transmitting (e.g., using transmission component 1304 depicted in FIG. 13) the second communication using the first operating frequency or a second operating frequency.

In a fifth aspect, alone or in combination with one or more of the first through fourth aspects, the first operating frequency is a higher frequency than the second operating frequency.

In a sixth aspect, alone or in combination with one or more of the first through fifth aspects, the first operating frequency is a lower frequency than the second operating frequency.

In a seventh aspect, alone or in combination with one or more of the first through sixth aspects, receiving, via the first wireless link, the first communication, comprises receiving (e.g., using reception component 1302 depicted in FIG. 13) a physical downlink shared channel (PDSCH) communication indicating the information of the first communication.

In an eighth aspect, alone or in combination with one or more of the first through seventh aspects, receiving, via the first wireless link, the first communication, comprises receiving (e.g., using reception component 1302 depicted in FIG. 13) a physical downlink control channel communication that schedules the PDSCH communication.

In a ninth aspect, alone or in combination with one or more of the first through eighth aspects, generating, using the digital processing operation, the second communication based at least in part on the information of the first communication, comprises generating (e.g., using signal generation component 1308 depicted in FIG. 13) a PDSCH communication, wherein the digital processing operation is based at least in part on the information of the first communication.

In a tenth aspect, alone or in combination with one or more of the first through ninth aspects, generating, using the digital processing operation, the second communication based at least in part on the information of the first communication, comprises generating (e.g., using signal generation component 1308 depicted in FIG. 13) a PDCCH communication to schedule the PDSCH communication.

In an eleventh aspect, alone or in combination with one or more of the first through tenth aspects, transmitting, via the second wireless link, the second communication comprises transmitting (e.g., using transmission component 1304, depicted in FIG. 13) the PDCCH communication that schedules the PDSCH communication, and transmitting the PDSCH communication based at least in part on the transmission of the PDCCH communication.

In a twelfth aspect, alone or in combination with one or more of the first through eleventh aspects, the information of the first communication indicates transmit configuration information associated with the second communication.

In a thirteenth aspect, alone or in combination with one or more of the first through twelfth aspects, the transmit configuration information includes at least one of a resource allocation for the second communication, or a beamforming configuration for the second communication.

In a fourteenth aspect, alone or in combination with one or more of the first through thirteenth aspects, generating, using the digital processing operation, the second communication based at least in part on the information of the first communication, is based at least in part on the transmit configuration information.

In a fifteenth aspect, alone or in combination with one or more of the first through fourteenth aspects, transmitting, via the second wireless link, the second communication, is based at least in part on the transmit configuration information.

In a sixteenth aspect, alone or in combination with one or more of the first through fifteenth aspects, the first wireless link is a wireless access link and the second wireless link is a wireless fronthaul link, and wherein the first communication is an uplink communication and the second communication is an uplink communication.

In a seventeenth aspect, alone or in combination with one or more of the first through sixteenth aspects, receiving, via the first wireless link, the first communication, is based at least in part on the control configuration for the relaying operation.

In an eighteenth aspect, alone or in combination with one or more of the first through seventeenth aspects, generating, using the digital processing operation, the second communication based at least in part on the information of the first communication, comprises digitally processing (e.g., using signal generation component 1308 depicted in FIG. 13) the first communication in accordance with the control configuration for the relaying operation, determining (e.g., using signal generation component 1308 depicted in FIG. 13) information associated with the first communication based at least in part on the digital processing of the first communication, and generating (e.g., using signal generation component 1308, depicted in FIG. 13) the second communication that includes an information that indicates the information associated with the first communication.

In a nineteenth aspect, alone or in combination with one or more of the first through eighteenth aspects, the information associated with the first communication comprises at least one of one or more time domain IQ samples associated with the first communication, one or more frequency domain IQ samples associated with the first communication, one or more IQ samples of occupied tones associated with the first communication, a received codeword associated with the first communication, a transport block associated with the first communication, a received reference signal associated with the first communication, or one or more parameters of a received reference signal associated with the first communication.

In a twentieth aspect, alone or in combination with one or more of the first through nineteenth aspects, the control configuration for the relaying operation indicates information associated with relaying the first communication.

In a twenty-first aspect, alone or in combination with one or more of the first through twentieth aspects, the information associated with relaying the first communication comprises at least one of a resource allocation associated with receiving the first communication, a resource allocation associated with transmitting the second communication, or a configuration associated with the first communication.

In a twenty-second aspect, alone or in combination with one or more of the first through twenty-first aspects, the information associated with relaying the first communication indicates a scheduling grant associated with scheduling the first communication, and process 1100 includes transmitting (e.g., using transmission component 1304 depicted in FIG. 13), via the first wireless link, a control channel communication indicating the scheduling grant associated with scheduling the first communication.

In a twenty-third aspect, alone or in combination with one or more of the first through twenty-second aspects, receiving, via the first wireless link, the first communication comprises receiving (e.g., using reception component 1302 depicted in FIG. 13), via a wireless access link, a first PUSCH communication.

In a twenty-fourth aspect, alone or in combination with one or more of the first through twenty-third aspects, transmitting, via the second wireless link, the second communication comprises transmitting (e.g., using transmission component 1304 depicted in FIG. 13), via a wireless fronthaul link, a second PUSCH communication, wherein an information of the second PUSCH communication indicates information associated with the first PUSCH communication.

In a twenty-fifth aspect, alone or in combination with one or more of the first through twenty-fourth aspects, receiving, via the first wireless link, the first communication comprises receiving (e.g., using reception component 1302 depicted in FIG. 13), via a wireless access link, a first PUCCH communication.

In a twenty-sixth aspect, alone or in combination with one or more of the first through twenty-fifth aspects, transmitting, via the second wireless link, the second communication comprises transmitting (e.g., using transmission component 1304 depicted in FIG. 13), via a wireless fronthaul link, a second PUCCH communication, wherein an information of the second PUCCH communication indicates information associated with the first PUCCH communication.

In a twenty-seventh aspect, alone or in combination with one or more of the first through twenty-sixth aspects, process 1100 includes establishing (e.g., using establishment component 1310 depicted in FIG. 13), by a mobile terminal unit of the relay node, the wireless control interface with the control node.

In a twenty-eighth aspect, alone or in combination with one or more of the first through twenty-seventh aspects, receiving, via the first wireless link, the first communication, comprises receiving (e.g., using reception component 1302 depicted in FIG. 13) the first communication using an operating frequency, and receiving, from the control node via the wireless control interface, the control configuration for the relaying operation comprises receiving (e.g., using reception component 1302 depicted in FIG. 13) the control configuration using the operating frequency.

In a twenty-ninth aspect, alone or in combination with one or more of the first through twenty-eighth aspects, receiving the control configuration using the operating frequency comprises receiving (e.g., using reception component 1302, depicted in FIG. 13) the control configuration using a bandwidth part associated with the operating frequency.

In a thirtieth aspect, alone or in combination with one or more of the first through twenty-ninth aspects, receiving, via the first wireless link, the first communication, comprises receiving (e.g., using reception component 1302 depicted in FIG. 13) the first communication using a first RAT, and receiving, from the control node via the wireless control interface, the control configuration for the relaying operation comprises receiving (e.g., using reception component 1302, depicted in FIG. 13) the control configuration using a second RAT.

In a thirty-first aspect, alone or in combination with one or more of the first through thirtieth aspects, receiving, via the first wireless link, the first communication, comprises receiving (e.g., using reception component 1302 depicted in FIG. 13) the first communication using a first operating frequency, and receiving, from the control node via the wireless control interface, the control configuration for the relaying operation, comprises receiving (e.g., using reception component 1302 depicted in FIG. 13) the control configuration using a second operating frequency.

In a thirty-second aspect, alone or in combination with one or more of the first through thirty-first aspects, transmitting, via the second wireless link, the second communication, comprises transmitting (e.g., using transmission component 1304 depicted in FIG. 13) the second communication using an operating frequency, and receiving, from the control node via the wireless control interface, the control configuration for the relaying operation comprises receiving (e.g., using reception component 1302 depicted in FIG. 13) the control configuration using the operating frequency.

In a thirty-third aspect, alone or in combination with one or more of the first through thirty-second aspects, transmitting, via the second wireless link, the second communication comprises transmitting (e.g., using transmission component 1304 depicted in FIG. 13) the second communication using a first RAT, and receiving, from the control node via the wireless control interface, the control configuration for the relaying operation comprises receiving (e.g., using reception component 1302 depicted in FIG. 13) the control configuration using a second RAT.

In a thirty-fourth aspect, alone or in combination with one or more of the first through thirty-third aspects, transmitting, via the second wireless link, the second communication, comprises transmitting (e.g., using transmission component 1304 depicted in FIG. 13) the second communication using a first operating frequency, and receiving, from the control node via the control interface, the control configuration comprises receiving (e.g., using reception component 1302 depicted in FIG. 13) the configuration using a second operating frequency.

In a thirty-fifth aspect, alone or in combination with one or more of the first through thirty-fourth aspects, receiving, from the control node via the wireless control interface, the control configuration for the relaying operation comprises receiving (e.g., using reception component 1302 depicted in FIG. 13) the control configuration using at least one of radio resource control signaling, medium access control signaling, downlinking control information signaling, lower-layer signaling, upper-layer signaling, or application-layer signaling.

In a thirty-sixth aspect, alone or in combination with one or more of the first through thirty-fifth aspects, the control configuration for the relaying operation indicates at least one of a receive configuration, a transmit configuration, a reporting configuration, a numerology configuration, a beamforming configuration, element mapping information, channeling estimation information, order information, layer mapping information, a precoding configuration, one or more scrambling identifiers, or a network coding configuration.

In a thirty-seventh aspect, alone or in combination with one or more of the first through thirty-sixth aspects, the receive configuration indicates at least one of a receive analog beamforming configuration, a time domain resource allocation associated with receiving uplink communications, receiving frequency information, an analog-to-digital conversion configuration, or an IQ sample compression setting.

In a thirty-eighth aspect, alone or in combination with one or more of the first through thirty-seventh aspects, the transmit configuration indicates at least one of a transmit analog beamforming configuration, a time domain resource allocation associated with transmitting downlink communications, a transmit power setting, a transmit amplification setting, a transmit center frequency, or an IQ sample decompression setting.

In a thirty-ninth aspect, alone or in combination with one or more of the first through thirty-eighth aspects, the reporting configuration indicates a request for at least one of a buffer status of the relay node, a power status of the relay node, a measurement report indicating measurements performed by the relay node, or one or more relaying capabilities of the relay node.

In a fortieth aspect, alone or in combination with one or more of the first through thirty-ninth aspects, the numerology configuration indicates at least one of a cyclic prefix size to be used by the relay node, a subcarrier spacing size to be used by the relay node, or a fast Fourier transform size to be used by the relay node.

In a forty-first aspect, alone or in combination with one or more of the first through fortieth aspects, the beamforming configuration indicates one or more beam indexes associated with a beamforming codebook stored by the relay node.

In a forty-second aspect, alone or in combination with one or more of the first through forty-first aspects, the beamforming configuration indicates at least one of a phase setting for one or more antenna elements of the relay node, or an amplitude setting for one or more antenna elements of the relay node.

In a forty-third aspect, alone or in combination with one or more of the first through forty-second aspects, the control configuration for the relaying operation includes a set of information elements, and receiving, from the control node via the wireless control interface, the control configuration for the relaying operation comprises dynamically receiving (e.g., using reception component 1302 depicted in FIG. 13), from the control node via the wireless control interface, a first subset of information elements of the set of information elements, and semi-statically receiving (e.g., using reception component 1302 depicted in FIG. 13), from the control node via the wireless control interface, a second subset of information elements of the set of information elements.

In a forty-fourth aspect, alone or in combination with one or more of the first through forty-third aspects, receiving, via the first wireless link, the first communication comprises receiving (e.g., using reception component 1302 depicted in FIG. 13), from the control node, the first communication.

In a forty-fifth aspect, alone or in combination with one or more of the first through forty-fourth aspects, transmitting, via the second wireless link, the second communication comprises transmitting (e.g., using transmission component 1304 depicted in FIG. 13), to the control node, the second communication.

In a forty-sixth aspect, alone or in combination with one or more of the first through forty-fifth aspects, process 1100 includes transmitting (e.g., using transmission component 1304 depicted in FIG. 13), to the control node via the wireless control interface, a configuration indicating a relaying capability of the relay node.

In a forty-seventh aspect, alone or in combination with one or more of the first through forty-sixth aspects, the configuration indicating the relaying capability of the relay node indicates at least one of one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an IQ sample compression capability.

In a forty-eighth aspect, alone or in combination with one or more of the first through forty-seventh aspects, receiving, via the first wireless link, the first communication comprising performing (e.g., using reception component 1302 depicted in FIG. 13) a reception beamforming operation indicated in the control configuration for the relaying operation, and receiving (e.g., using reception component 1302 depicted in FIG. 13) the first communication based at least in part on performing the reception beamforming operation.

In a forty-ninth aspect, alone or in combination with one or more of the first through forty-eighth aspects, transmitting, via the second wireless link, the second communication comprises performing (e.g., using transmission component 1304 depicted in FIG. 13) a transmission beamforming operation indicated in the control configuration for the relaying operation, and transmitting (e.g., using transmission component 1304, depicted in FIG. 13) the second communication based at least in part on performing the transmission beamforming operation.

In a fiftieth aspect, alone or in combination with one or more of the first through forty-ninth aspects, the relay node is a Layer 1 relay node.

In a fifty-first aspect, alone or in combination with one or more of the first through fiftieth aspects, the wireless control interface is associated with the first wireless link or the second wireless link.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
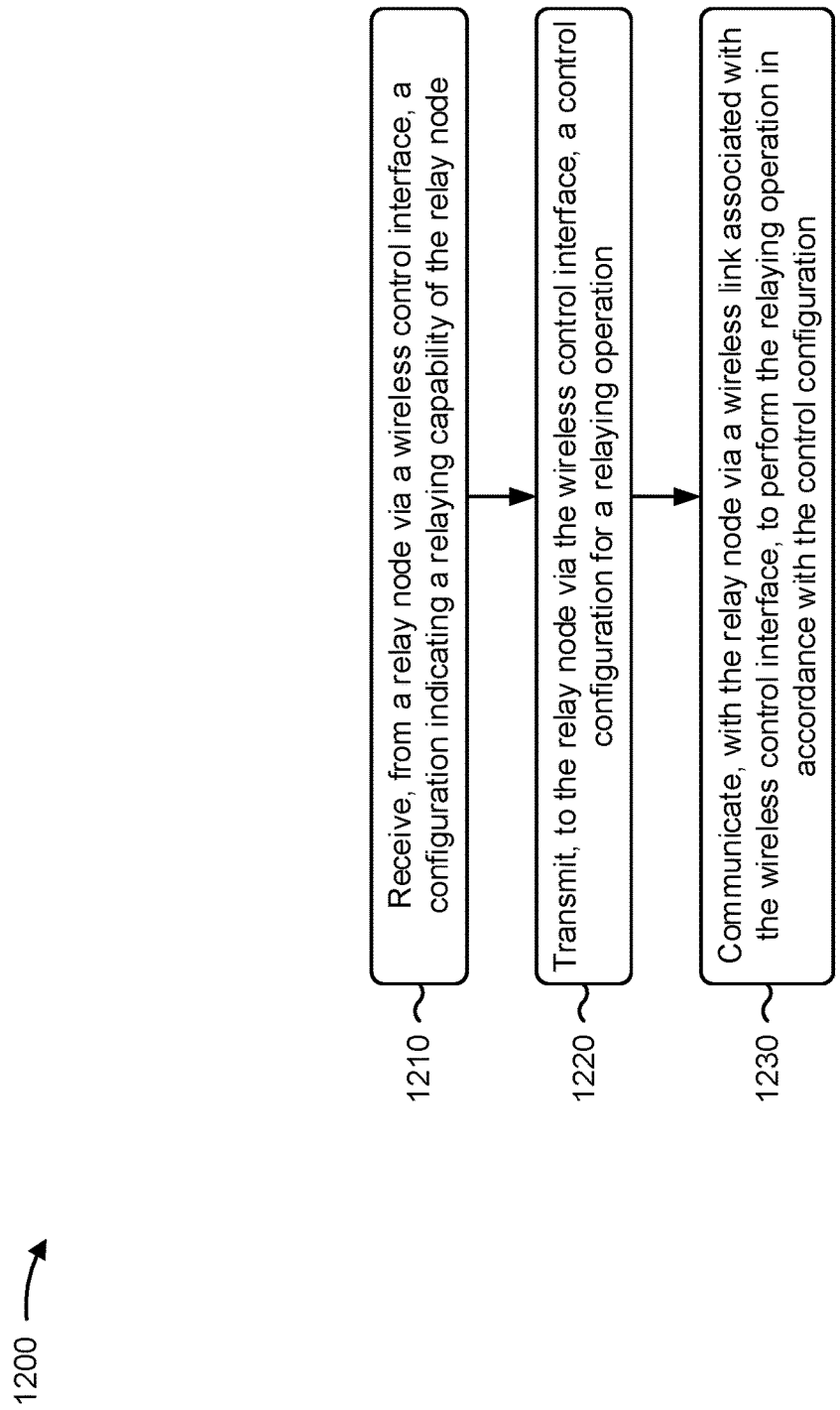

FIG. 12 is a diagram illustrating an example process 1200 performed, for example, by a control node, in accordance with the present disclosure. Example process 1200 is an example where the control node (e.g., control node 705, first wireless node 505, second wireless node 515, an IAB node, a DU of an IAB node, an IAB donor, a base station 110, and/or the like) performs operations associated with techniques for communicating using a relay node.

As shown in FIG. 12, in some aspects, process 1200 may include receiving, from a relay node via a wireless control interface, a configuration indicating a relaying capability of the relay node (block 1210). For example, the control node (e.g., using reception component 1402 depicted in FIG. 14) may receive, from a relay node via a wireless control interface, a configuration indicating a relaying capability of the relay node, as described above.

As further shown in FIG. 12, in some aspects, process 1200 may include transmitting, to the relay node via the wireless control interface, a control configuration for a relaying operation (block 1220). For example, the control node (e.g., using transmission component 1404 depicted in FIG. 14) may transmit, to the relay node via the wireless control interface, a control configuration for a relaying operation, as described above.

As further shown in FIG. 12, in some aspects, process 1200 may include communicating, with the relay node via a wireless link associated with the wireless control interface, to perform the relaying operation in accordance with the control configuration (block 1230). For example, the control node (e.g., using reception component 1402 and/or transmission component 1404 depicted in FIG. 14) may communicate, with the relay node via a wireless link associated with the wireless control interface, to perform the relaying operation in accordance with the control configuration, as described above.

Process 1200 may include additional aspects, such as any single aspect or any combination of aspects described below and/or in connection with one or more other processes described elsewhere herein.

In a first aspect, process 1200 includes determining (e.g., using determination component 1408 depicted in FIG. 14) the control configuration for a relaying operation based at least in part on the configuration indicating a relaying capability of the relay node.

In a second aspect, alone or in combination with the first aspect, the wireless link is a wireless fronthaul link.

In a third aspect, alone or in combination with one or more of the first and second aspects, communicating, with the relay node via a wireless link associated with the wireless control interface, to perform the relaying operation in accordance with the control configuration comprises transmitting (e.g., using transmission component 1404 depicted in FIG. 14), to the relay node via the wireless link, a communication that indicates information and the control configuration for the relaying operation.

In a fourth aspect, alone or in combination with one or more of the first through third aspects, the information of the communication comprises at least one of one or more time domain IQ samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

In a fifth aspect, alone or in combination with one or more of the first through fourth aspects, communicating, with the relay node via a wireless link associated with the wireless control interface, to perform the relaying operation in accordance with the control configuration comprises transmitting (e.g., using transmission component 1404 depicted in FIG. 14), to the relay node, a PDSCH communication indicating information associated with a communication to be transmitted by the relay node to a wireless node.

In a sixth aspect, alone or in combination with one or more of the first through fifth aspects, communicating, with the relay node via a wireless link associated with the wireless control interface, to perform the relaying operation in accordance with the control configuration comprises transmitting (e.g., using transmission component 1404 depicted in FIG. 14), to the relay node, a physical downlink control channel communication that schedules the PDSCH communication.

In a seventh aspect, alone or in combination with one or more of the first through sixth aspects, transmitting, to the relay node via the wireless control interface, the control configuration for a relaying operation comprises transmitting (e.g., using transmission component 1404 depicted in FIG. 14), to the relay node, transmit configuration information associated with the relaying operation.

In an eighth aspect, alone or in combination with one or more of the first through seventh aspects, the transmit configuration information includes at least one of a resource allocation for a communication to be transmitted by the relay node, or a beamforming configuration for a communication to be transmitted by the relay node.

In a ninth aspect, alone or in combination with one or more of the first through eighth aspects, communicating, with the relay node via a wireless link associated with the wireless control interface, to perform the relaying operation in accordance with the control configuration comprises receiving (e.g., using reception component 1402 depicted in FIG. 14), from the relay node, a first communication that includes information, wherein the information indicates information associated with a second communication that was received by the relay node.

In a tenth aspect, alone or in combination with one or more of the first through ninth aspects, the information associated with a second communication that was received by the relay node comprises at least one of one or more time domain IQ samples associated with the second communication, one or more frequency domain IQ samples associated with the second communication, one or more IQ samples of occupied tones associated with the second communication, a received codeword associated with the second communication, a transport block associated with the second communication, a received reference signal associated with the second communication, or one or more parameters of a received reference signal associated with the second communication.

In an eleventh aspect, alone or in combination with one or more of the first through tenth aspects, communicating, with the relay node via a wireless link associated with the wireless control interface, to perform the relaying operation in accordance with the control configuration comprises receiving (e.g., using reception component 1402 depicted in FIG. 14), from the relay node via a wireless fronthaul link, a first PUSCH communication, wherein an information of the first PUSCH communication indicates information associated with a second PUSCH communication that was received by the relay node.

In a twelfth aspect, alone or in combination with one or more of the first through eleventh aspects, communicating, with the relay node via a wireless link associated with the wireless control interface, to perform the relaying operation in accordance with the control configuration comprises receiving (e.g., using reception component 1402 depicted in FIG. 14), from the relay node via a wireless fronthaul link, a first PUCCH communication, wherein an information of the first PUCCH communication indicates information associated with a second PUCCH communication that was received by the relay node.

In a thirteenth aspect, alone or in combination with one or more of the first through twelfth aspects, process 1200 includes establishing (e.g., using establishment component 1410 depicted in FIG. 14), with a mobile terminal unit of the relay node, the wireless control interface with the control node.

Figure 14:
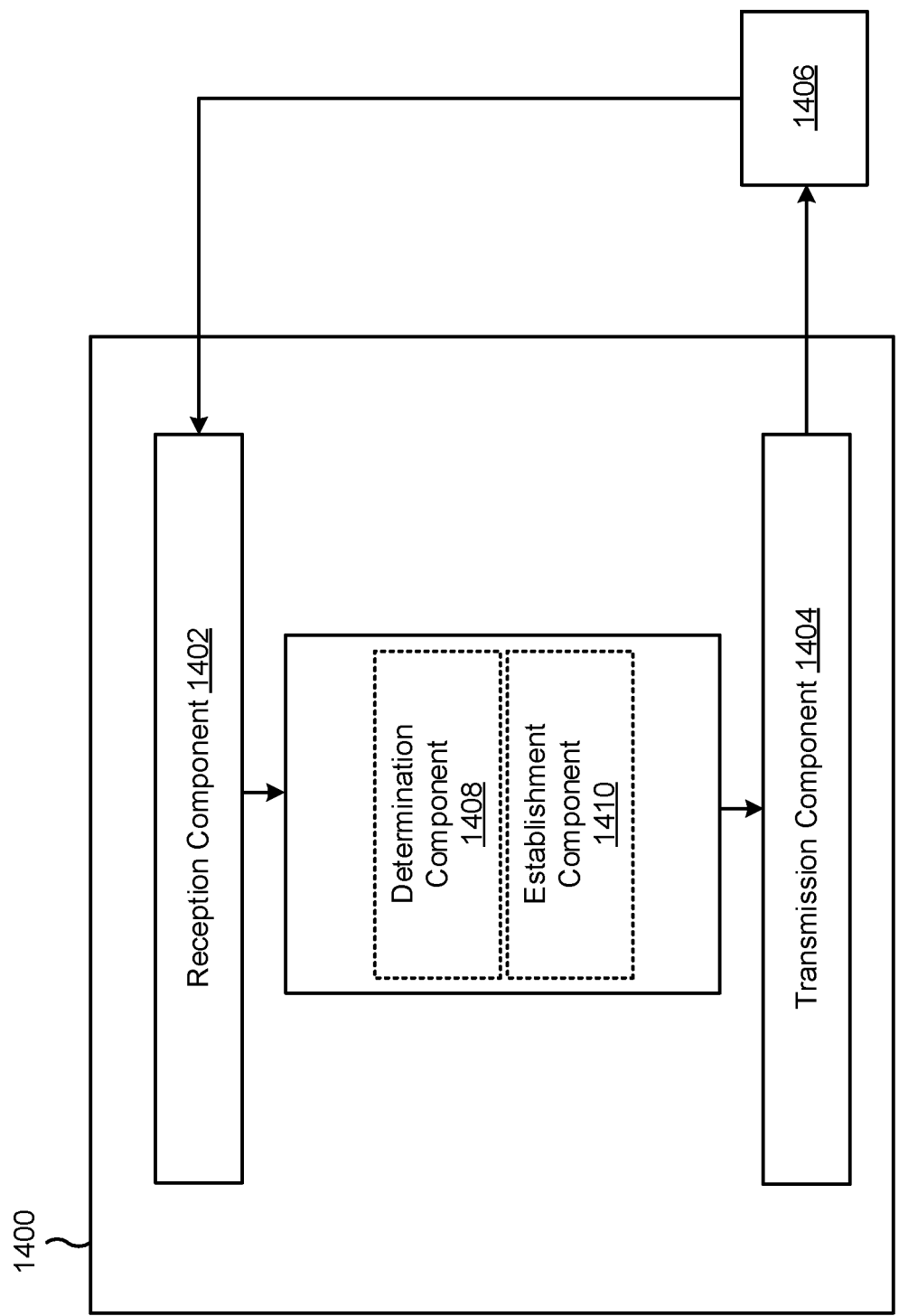

In a fourteenth aspect, alone or in combination with one or more of the first through thirteenth aspects, communicating, with the relay node via the wireless link associated with the wireless control interface, to perform the relaying operation in accordance with the control configuration comprises communicating (e.g., using reception component 1402 and/or transmission component 1404 depicted in FIG. 14), with the relay node via the wireless link associated with the wireless control interface, using an operating frequency, and transmitting (e.g., using transmission component 1404 depicted in FIG. 14), to the control node via the wireless control interface, the control configuration for the relaying operation comprises transmitting the control configuration using the operating frequency.

In a fifteenth aspect, alone or in combination with one or more of the first through fourteenth aspects, transmitting the control configuration using the operating frequency comprises transmitting (e.g., using transmission component 1404 depicted in FIG. 14) the control configuration using a bandwidth part associated with the operating frequency.

In a sixteenth aspect, alone or in combination with one or more of the first through fifteenth aspects, communicating, with the relay node via the wireless link associated with the wireless control interface, to perform the relaying operation in accordance with the control configuration comprises communicating (e.g., using reception component 1402 and/or transmission component 1404 depicted in FIG. 14), with the relay node via the wireless link associated with the wireless control interface, using a first RAT, and transmitting, to the control node via the wireless control interface, the control configuration for the relaying operation comprises transmitting (e.g., using transmission component 1404 depicted in FIG. 14) the control configuration using a second RAT.

In a seventeenth aspect, alone or in combination with one or more of the first through sixteenth aspects, communicating, with the relay node via the wireless link associated with the wireless control interface, to perform the relaying operation in accordance with the control configuration comprises communicating (e.g., using reception component 1402 and/or transmission component 1404 depicted in FIG. 14), with the relay node via the wireless link associated with the wireless control interface, using a first operating frequency, and transmitting, to the control node via the wireless control interface, the control configuration for the relaying operation comprises transmitting (e.g., using transmission component 1404 depicted in FIG. 14) the control configuration using a second operating frequency.

In an eighteenth aspect, alone or in combination with one or more of the first through seventeenth aspects, transmitting, to the relay node via the wireless control interface, the control configuration for the relaying operation comprises transmitting (e.g., using transmission component 1404 depicted in FIG. 14) the control configuration using at least one of radio resource control signaling, medium access control signaling, downlinking control information signaling, lower-layer signaling, upper-layer signaling, or application-layer signaling.

In a nineteenth aspect, alone or in combination with one or more of the first through eighteenth aspects, the control configuration for the relaying operation indicates at least one of a receive configuration, a transmit configuration, a reporting configuration, a numerology configuration, a beamforming configuration, element mapping information, channeling estimation information, order information, layer mapping information, a precoding configuration, one or more scrambling identifiers, or a network coding configuration.

In a twentieth aspect, alone or in combination with one or more of the first through nineteenth aspects, the receive configuration indicates at least one of a receive analog beamforming configuration, a time domain resource allocation associated with the relay node receiving uplink communications, receiving frequency information, an analog-to-digital conversion configuration, or an IQ sample compression setting.

In a twenty-first aspect, alone or in combination with one or more of the first through twentieth aspects, the transmit configuration indicates at least one of a transmit analog beamforming configuration, a time domain resource allocation associated with the relay node transmitting downlink communications, a transmit power setting, a transmit amplification setting, a transmit center frequency, or an IQ sample decompression setting.

In a twenty-second aspect, alone or in combination with one or more of the first through twenty-first aspects, the reporting configuration indicates a request for at least one of a buffer status of the relay node, a power status of the relay node, a measurement report indicating measurements performed by the relay node, or one or more relaying capabilities of the relay node.

In a twenty-third aspect, alone or in combination with one or more of the first through twenty-second aspects, the numerology configuration indicates at least one of a cyclic prefix size to be used by the relay node, a subcarrier spacing size to be used by the relay node, or a fast Fourier transform size to be used by the relay node.

In a twenty-fourth aspect, alone or in combination with one or more of the first through twenty-third aspects, the beamforming configuration indicates one or more beam indexes associated with a beamforming codebook stored by the relay node.

In a twenty-fifth aspect, alone or in combination with one or more of the first through twenty-fourth aspects, the beamforming configuration indicates at least one of a phase setting for one or more antenna elements of the relay node, or an amplitude setting for one or more antenna elements of the relay node.

In a twenty-sixth aspect, alone or in combination with one or more of the first through twenty-fifth aspects, the control configuration for the relaying operation includes a set of information elements, and transmitting, to the relay node via the wireless control interface, the control configuration for the relaying operation comprises dynamically transmitting (e.g., using transmission component 1404 depicted in FIG. 14), to the relay node via the wireless control interface, a first subset of information elements of the set of information elements, and semi-statically transmitting (e.g., using transmission component 1404 depicted in FIG. 14), to the relay node via the wireless control interface, a second subset of information elements of the set of information elements.

In a twenty-seventh aspect, alone or in combination with one or more of the first through twenty-sixth aspects, the configuration indicating the relaying capability of the relay node indicates at least one of one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an IQ sample compression capability.

In a twenty-eighth aspect, alone or in combination with one or more of the first through twenty-seventh aspects, the relay node is a Layer 1 relay node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
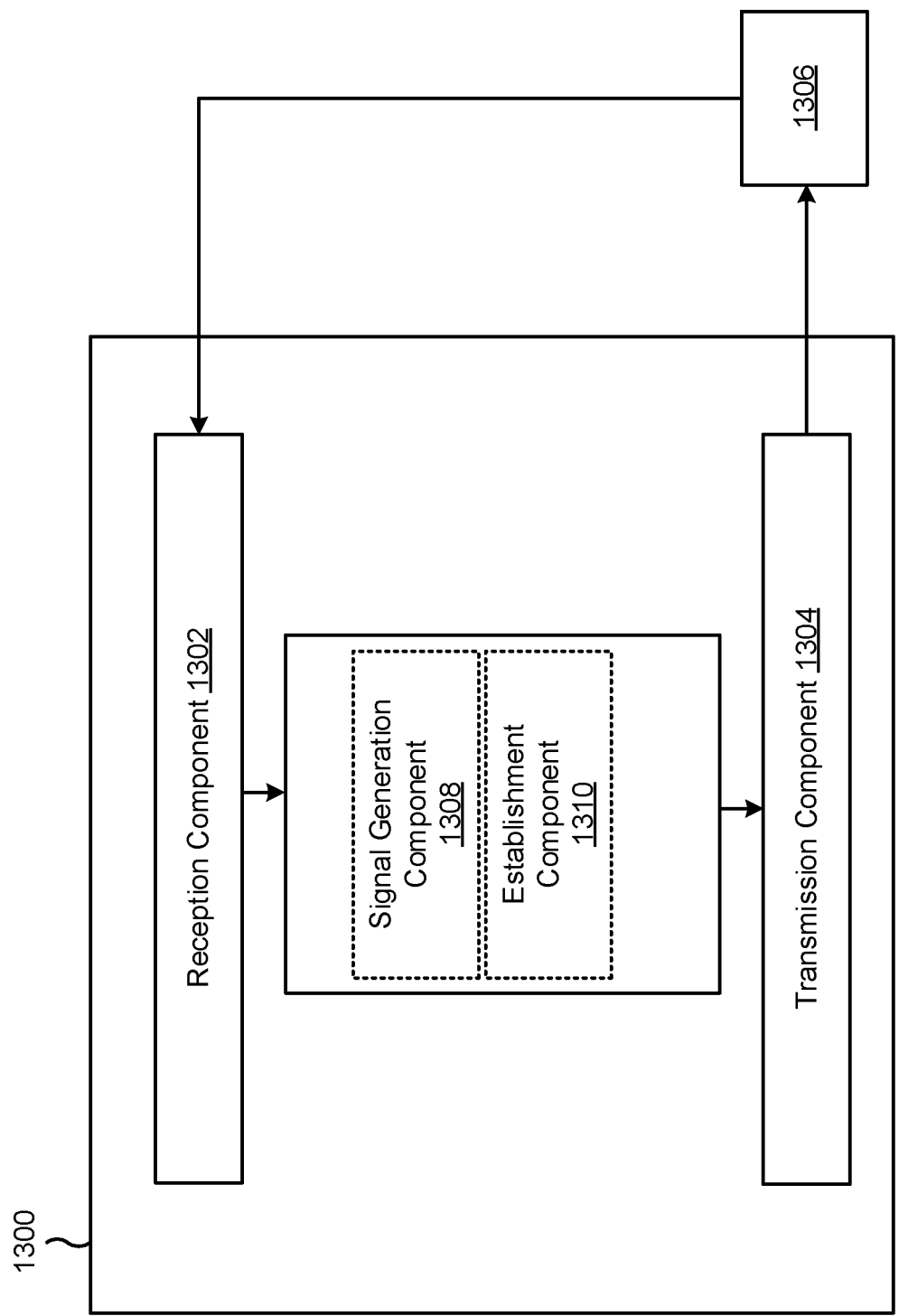
FIGS. 13 and 14 are block diagrams of example apparatus for wireless communication, in accordance with the present disclosure.

FIG. 13 is a block diagram of an example apparatus 1300 for wireless communication. The apparatus 1300 may be a relay node, or a relay node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a signal generation component 1308, an establishment component 1310, among other examples.

In some aspects, the apparatus 1300 may be configured to perform one or more operations described herein in connection with FIGS. 7, 8A, 8B, 9 and/or 10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the relay node described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the relay node described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the relay node described above in connection with FIG. 2. In some aspects, the transmission component 1304 may be collocated with the reception component 1302 in a transceiver.

The reception component 1302 may receive, from a control node via a wireless control interface, a control configuration for a relaying operation. The reception component 1302 may receive, via a first wireless link, a first communication based at least in part on the control configuration for the relaying operation. The signal generation component 1308 may generate, using a digital processing operation indicated by the control configuration, a second communication based at least in part on an information of the first communication, wherein the second communication is different than the first communication. In some aspects, the signal generation component 1308 may include one or more antennas, a demodulator, a MIMO detector, a receive processor, a modulator, a transmit MIMO processor, a transmit processor, a controller/processor, a memory, or a combination thereof, of the relay node described above in connection with FIG. 2. The transmission component 1304 may transmit, via a second wireless link, the second communication based at least in part on the control configuration for the relaying operation.

The reception component 1302 may receive, from the control node, the control configuration indicating information associated with relaying communications. The reception component 1302 may receive a communication indicating information associated with relaying the first communication. The reception component 1302 may receive, from the control node via the wireless control interface, a control configuration indicating control information for relaying operations.

The reception component 1302 may perform a reception beamforming operation indicated in the control configuration for the relaying operation associated with receiving the first communication. The transmission component 1304 may perform a transmission beamforming operation indicated in the control configuration for the relaying operation associated with transmitting the second communication.

The establishment component 1310 may establish the wireless control interface with the control node. In some aspects, the establishment component 1310 may include one or more antennas, a demodulator, a MIMO detector, a receive processor, a modulator, a transmit MIMO processor, a transmit processor, a controller/processor, a memory, or a combination thereof, of the relay node described above in connection with FIG. 2.

The transmission component 1304 may transmit, to the control node via the wireless control interface, a configuration indicating a relaying capability of the relay node.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

FIG. 14 is a block diagram of an example apparatus 1400 for wireless communication. The apparatus 1400 may be a control node, or a control node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a determination component 1408, an establishment component 1410, among other examples.

In some aspects, the apparatus 1400 may be configured to perform one or more operations described herein in connection with FIGS. 7, 8A, 8B, 9 and/or 10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the control node described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the control node described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the control node described above in connection with FIG. 2. In some aspects, the transmission component 1404 may be collocated with the reception component 1402 in a transceiver.

The reception component 1402 may receive, from a relay node via a wireless control interface, a configuration indicating a relaying capability of the relay node. The transmission component 1404 may transmit, to the relay node via the wireless control interface, a control configuration for a relaying operation. The reception component 1402 and/or the transmission component 1404 may communicate, with the relay node via a wireless link associated with the wireless control interface, to perform the relaying operation in accordance with the control configuration.

The determination component 1408 may determine the control configuration for a relaying operation based at least in part on the configuration indicating a relaying capability of the relay node. In some aspects, the determination component 1408 may include one or more receive processor, a transmit MIMO processor, a transmit processor, a controller/processor, a memory, or a combination thereof, of the control node described above in connection with FIG. 2.

The establishment component 1410 may establish, with a mobile terminal unit of the relay node, the wireless control interface with the control node. In some aspects, the establishment component 1410 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a relay node, comprising: receiving, from a control node via a wireless control interface, a control configuration for a relaying operation; receiving, via a first wireless link, a first communication based at least in part on the control configuration for the relaying operation; generating, using a digital processing operation indicated by the control configuration, a second communication based at least in part on an information of the first communication, wherein the second communication is different than the first communication; and transmitting, via a second wireless link, the second communication based at least in part on the control configuration for the relaying operation.

Aspect 2: The method of Aspect 1, wherein the first wireless link is a wireless fronthaul link and the second wireless link is a wireless access link, and wherein the first communication is a downlink communication and the second communication is a downlink communication.

Aspect 3: The method of any of Aspects 1-2, wherein receiving, via the first wireless link, the first communication, comprises: decoding the first communication; and determining the information of the first communication based at least in part on decoding the first communication.

Aspect 4: The method of Aspect 3, wherein the information of the first communication comprises at least one of: one or more time domain in-phase/quadrature (IQ) samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

Aspect 5: The method of any of Aspects 1-4, wherein receiving, via the first wireless link, the first communication, comprises: receiving the first communication using a first operating frequency; and wherein transmitting, via the second wireless link, the second communication, comprises: transmitting the second communication using the first operating frequency or a second operating frequency.

Aspect 6: The method of Aspect 5, wherein the first operating frequency is a higher frequency than the second operating frequency.

Aspect 7: The method of Aspect 5, wherein the first operating frequency is a lower frequency than the second operating frequency.

Aspect 8: The method of any of Aspects 1-7, wherein receiving, via the first wireless link, the first communication, comprises: receiving a physical downlink shared channel (PDSCH) communication indicating the information of the first communication.

Aspect 9: The method of Aspect 8, wherein receiving, via the first wireless link, the first communication, comprises: receiving a physical downlink control channel communication that schedules the PDSCH communication.

Aspect 10: The method of any of Aspects 1-9, wherein generating, using the digital processing operation, the second communication based at least in part on the information of the first communication, comprises: generating a physical downlink shared channel (PDSCH) communication, wherein the digital processing operation is based at least in part on the information of the first communication.

Aspect 11: The method of Aspect 10, wherein generating, using the digital processing operation, the second communication based at least in part on the information of the first communication, comprises: generating a physical downlink control channel (PDCCH) communication to schedule the PDSCH communication.

Aspect 12: The method of Aspect 11, wherein transmitting, via the second wireless link, the second communication comprises: transmitting the PDCCH communication that schedules the PDSCH communication; and transmitting the PDSCH communication based at least in part on the transmission of the PDCCH communication.

Aspect 13: The method of any of Aspects 1-12, wherein the information of the first communication indicates transmit configuration information associated with the second communication.

Aspect 14: The method of Aspect 13, wherein the transmit configuration information includes at least one of: a resource allocation for the second communication, or a beamforming configuration for the second communication.

Aspect 15: The method of any of Aspects 13-14, wherein generating, using the digital processing operation, the second communication based at least in part on the information of the first communication, is based at least in part on the transmit configuration information.

Aspect 16: The method of any of Aspects 13-15, wherein transmitting, via the second wireless link, the second communication, is based at least in part on the transmit configuration information.

Aspect 17: The method of Aspect 1, wherein the first wireless link is a wireless access link and the second wireless link is a wireless fronthaul link, and wherein the first communication is an uplink communication and the second communication is an uplink communication.

Aspect 18: The method of any of Aspects 1-17, wherein receiving, via the first wireless link, the first communication, is based at least in part on the control configuration for the relaying operation.

Aspect 19: The method of any of Aspects 1-18, wherein generating, using the digital processing operation, the second communication based at least in part on the information of the first communication, comprises: digitally processing the first communication in accordance with the control configuration for the relaying operation; and determining information associated with the first communication based at least in part on the digital processing of the first communication; and generating the second communication that includes an information that indicates the information associated with the first communication.

Aspect 20: The method of Aspect 19, wherein the information associated with the first communication comprises at least one of: one or more time domain in-phase/quadrature (IQ) samples associated with the first communication, one or more frequency domain IQ samples associated with the first communication, one or more IQ samples of occupied tones associated with the first communication, a received codeword associated with the first communication, a transport block associated with the first communication, a received reference signal associated with the first communication, or one or more parameters of a received reference signal associated with the first communication.

Aspect 21: The method of any of Aspects 1-20, wherein the control configuration for the relaying operation indicates information associated with relaying the first communication.

Aspect 22: The method of Aspect 21, wherein the information associated with relaying the first communication comprises at least one of: a resource allocation associated with receiving the first communication, a resource allocation associated with transmitting the second communication, or a configuration associated with the first communication.

Aspect 23: The method of any of Aspects 21-22, wherein the information associated with relaying the first communication indicates a scheduling grant associated with scheduling the first communication, the method further comprising: transmitting, via the first wireless link, a control channel communication indicating the scheduling grant associated with scheduling the first communication.

Aspect 24: The method of any of Aspects 1 and 17-23, wherein receiving, via the first wireless link, the first communication comprises: receiving, via a wireless access link, a first physical uplink shared channel (PUSCH) communication.

Aspect 25: The method of Aspect 24, wherein transmitting, via the second wireless link, the second communication comprises: transmitting, via a wireless fronthaul link, a second PUSCH communication, wherein an information of the second PUSCH communication indicates information associated with the first PUSCH communication.

Aspect 26: The method of any of Aspects 1 and 17-23, wherein receiving, via the first wireless link, the first communication comprises: receiving, via a wireless access link, a first physical uplink control channel (PUCCH) communication.

Aspect 27: The method of Aspect 26, wherein transmitting, via the second wireless link, the second communication comprises: transmitting, via a wireless fronthaul link, a second PUCCH communication, wherein an information of the second PUCCH communication indicates information associated with the first PUCCH communication.

Aspect 28: The method of any of Aspects 1-27, further comprising: establishing, by a mobile terminal unit of the relay node, the wireless control interface with the control node.

Aspect 29: The method of any of Aspects 1-28, wherein receiving, via the first wireless link, the first communication, comprises: receiving the first communication using an operating frequency; and wherein receiving, from the control node via the wireless control interface, the control configuration for the relaying operation comprises: receiving the control configuration using the operating frequency.

Aspect 30: The method of Aspect 29, wherein receiving the control configuration using the operating frequency comprises: receiving the control configuration using a bandwidth part associated with the operating frequency.

Aspect 31: The method of any of Aspects 1-30, wherein receiving, via the first wireless link, the first communication, comprises: receiving the first communication using a first radio access technology (RAT); and wherein receiving, from the control node via the wireless control interface, the control configuration for the relaying operation comprises: receiving the control configuration using a second RAT.

Aspect 32: The method of any of Aspects 1-31, wherein receiving, via the first wireless link, the first communication, comprises: receiving the first communication using a first operating frequency; and wherein receiving, from the control node via the wireless control interface, the control configuration for the relaying operation, comprises: receiving the control configuration using a second operating frequency.

Aspect 33: The method of any of Aspects 1-32, wherein transmitting, via the second wireless link, the second communication, comprises: transmitting the second communication using an operating frequency; and wherein receiving, from the control node via the wireless control interface, the control configuration for the relaying operation comprises: receiving the control configuration using the operating frequency.

Aspect 34: The method of any of Aspects 1-33, wherein transmitting, via the second wireless link, the second communication comprises: transmitting the second communication using a first radio access technology (RAT); and wherein receiving, from the control node via the wireless control interface, the control configuration for the relaying operation comprises: receiving the control configuration using a second RAT.

Aspect 35: The method of any of Aspects 1-34, wherein transmitting, via the second wireless link, the second communication, comprises: transmitting the second communication using a first operating frequency; and wherein receiving, from the control node via the control interface, the control configuration for the relaying operations, comprises: receiving the control configuration using a second operating frequency.

Aspect 36: The method of any of Aspects 1-35, wherein receiving, from the control node via the wireless control interface, the control configuration for the relaying operation comprises: receiving the control configuration using at least one of: radio resource control signaling, medium access control signaling, downlink control information signaling, lower-layer signaling, upper-layer signaling, or application-layer signaling.

Aspect 37: The method of any of Aspects 1-36, wherein the control configuration for the relaying operation indicates at least one of: a receive configuration, a transmit configuration, a reporting configuration, a numerology configuration, a beamforming configuration, resource element mapping information, channel estimation information, modulation order information, layer mapping information, a precoding configuration, one or more scrambling identifiers, or a network coding configuration.

Aspect 38: The method of Aspect 37, wherein the receive configuration indicates at least one of: a receive analog beamforming configuration, a time domain resource allocation associated with receiving uplink communications, receive frequency information, an analog-to-digital conversion configuration, or an in-phase/quadrature (IQ) sample compression setting.

Aspect 39: The method of any of Aspects 37-38, wherein the transmit configuration indicates at least one of: a transmit analog beamforming configuration, a time domain resource allocation associated with transmitting downlink communications, a transmit power setting, a transmit amplification setting, a transmit center frequency, or an in-phase/quadrature (IQ) sample decompression setting.

Aspect 40: The method of any of Aspects 37-39, wherein the reporting configuration indicates a request for at least one of: a buffer status of the relay node, a power status of the relay node, a measurement report indicating measurements performed by the relay node, or one or more relaying capabilities of the relay node.

Aspect 41: The method of any of Aspects 37-40, wherein the numerology configuration indicates at least one of: a cyclic prefix size to be used by the relay node, a subcarrier spacing size to be used by the relay node, or a fast Fourier transform size to be used by the relay node.

Aspect 42: The method of any of Aspects 37-41, wherein the beamforming configuration indicates one or more beam indexes associated with a beamforming codebook stored by the relay node.

Aspect 43: The method of any of Aspects 37-42, wherein the beamforming configuration indicates at least one of: a phase setting for one or more antenna elements of the relay node, or an amplitude setting for one or more antenna elements of the relay node.

Aspect 44: The method of any of Aspects 1-43, wherein the control configuration for the relaying operation includes a set of information elements, and wherein receiving, from the control node via the wireless control interface, the control configuration for the relaying operation comprises: dynamically receiving, from the control node via the wireless control interface, a first subset of information elements of the set of information elements; and semi-statically receiving, from the control node via the wireless control interface, a second subset of information elements of the set of information elements.

Aspect 45: The method of any of Aspects 1-44, wherein receiving, via the first wireless link, the first communication comprises: receiving, from the control node, the first communication.

Aspect 46: The method of any of Aspects 1-45, wherein transmitting, via the second wireless link, the second communication comprises: transmitting, to the control node, the second communication.

Aspect 47: The method of any of Aspects 1-46, further comprising: transmitting, to the control node via the wireless control interface, a configuration indicating a relaying capability of the relay node.

Aspect 48: The method of Aspect 47, wherein the configuration indicating the relaying capability of the relay node indicates at least one of: one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an in-phase/quadrature (IQ) sample compression capability.

Aspect 49: The method of any of Aspects 1-48, wherein receiving, via the first wireless link, the first communication comprising: performing a reception beamforming operation indicated in the control configuration for the relaying operation; and receiving the first communication based at least in part on performing the reception beamforming operation.

Aspect 50: The method of any of Aspects 1-49, wherein transmitting, via the second wireless link, the second communication comprises: performing a transmission beamforming operation indicated in the control configuration for the relaying operation; and transmitting the second communication based at least in part on performing the transmission beamforming operation.

Aspect 51: The method of any of Aspects 1-50, wherein the relay node is a Layer 1 relay node.

Aspect 52: The method of any of Aspects 1-51, wherein the wireless control interface is associated with the first wireless link or the second wireless link.

Aspect 53: A method of wireless communication performed by a control node, comprising: receiving, from a relay node via a wireless control interface, a configuration indicating a relaying capability of the relay node; transmitting, to the relay node via the wireless control interface, a control configuration for a relaying operation; and communicating, with the relay node via a wireless link associated with the wireless control interface, to perform the relaying operation in accordance with the control configuration.

Aspect 54: The method of Aspect 53, further comprising: determining the control configuration for a relaying operation based at least in part on the configuration indicating a relaying capability of the relay node.

Aspect 55: The method of any of Aspects 53-54, wherein the wireless link is a wireless fronthaul link.

Aspect 56: The method of any of Aspects 53-55, wherein communicating, with the relay node via a wireless link associated with the wireless control interface, to perform the relaying operation in accordance with the control configuration comprises: transmitting, to the relay node via the wireless link, a communication that indicates information and the control configuration for the relaying operation.

Aspect 57: The method of Aspect 56, wherein the information of the communication comprises at least one of: one or more time domain in-phase/quadrature (IQ) samples associated with the second communication, one or more frequency domain IQ samples associated with the second communication, one or more IQ samples of occupied tones associated with the second communication, a codeword associated with the second communication, a transport block associated with the second communication, a reference signal associated with the second communication, or one or more parameters to generate a reference signal associated with the second communication.

Aspect 58: The method of any of Aspects 53-57, wherein communicating, with the relay node via a wireless link associated with the wireless control interface, to perform the relaying operation in accordance with the control configuration comprises: transmitting, to the relay node, a physical downlink shared channel (PDSCH) communication indicating information associated with a communication to be transmitted by the relay node to a wireless node.

Aspect 59: The method of Aspect 58, wherein communicating, with the relay node via a wireless link associated with the wireless control interface, to perform the relaying operation in accordance with the control configuration comprises: transmitting, to the relay node, a physical downlink control channel communication that schedules the PDSCH communication.

Aspect 60: The method of any of Aspects 53-59, wherein transmitting, to the relay node via the wireless control interface, the control configuration for a relaying operation comprises: transmitting, to the relay node, transmit configuration information associated with the relaying operation.

Aspect 61: The method of Aspect 60, wherein the transmit configuration information includes at least one of: a resource allocation for a communication to be transmitted by the relay node, or a beamforming configuration for a communication to be transmitted by the relay node.

Aspect 62: The method of any of Aspects 53-61, wherein communicating, with the relay node via a wireless link associated with the wireless control interface, to perform the relaying operation in accordance with the control configuration comprises: receiving, from the relay node, a first communication that includes information, wherein the information indicates information associated with a second communication that was received by the relay node.

Aspect 63: The method of Aspect 62, wherein the information associated with a second communication that was received by the relay node comprises at least one of: one or more time domain in-phase/quadrature (IQ) samples associated with the second communication, one or more frequency domain IQ samples associated with the second communication, one or more IQ samples of occupied tones associated with the second communication, a received codeword associated with the second communication, a transport block associated with the second communication, a received reference signal associated with the second communication, or one or more parameters of a received reference signal associated with the second communication.

Aspect 64: The method of any of Aspects 53-63, wherein communicating, with the relay node via a wireless link associated with the wireless control interface, to perform the relaying operation in accordance with the control configuration comprises: receiving, from the relay node via a wireless fronthaul link, a first physical uplink shared channel (PUSCH) communication, wherein an information of the first PUSCH communication indicates information associated with a second PUSCH communication that was received by the relay node.

Aspect 65: The method of Aspect 64, wherein communicating, with the relay node via a wireless link associated with the wireless control interface, to perform the relaying operation in accordance with the control configuration comprises: receiving, from the relay node via a wireless fronthaul link, a first physical uplink control channel (PUCCH) communication, wherein an information of the first PUCCH communication indicates information associated with a second PUCCH communication that was received by the relay node.

Aspect 66: The method of any of Aspects 53-65, further comprising: establishing, with a mobile terminal unit of the relay node, the wireless control interface with the control node.

Aspect 67: The method of any of Aspects 53-66, wherein communicating, with the relay node via the wireless link associated with the wireless control interface, to perform the relaying operation in accordance with the control configuration comprises: communicating, with the relay node via the wireless link associated with the wireless control interface, using an operating frequency; and wherein transmitting, to the control node via the wireless control interface, the control configuration for the relaying operation comprises: transmitting the control configuration using the operating frequency.

Aspect 68: The method of Aspect 67, wherein transmitting the control configuration using the operating frequency comprises: transmitting the control configuration using a bandwidth part associated with the operating frequency.

Aspect 69: The method of any of Aspects 53-68, wherein communicating, with the relay node via the wireless link associated with the wireless control interface, to perform the relaying operation in accordance with the control configuration comprises: communicating, with the relay node via the wireless link associated with the wireless control interface, using a first radio access technology (RAT); and wherein transmitting, to the control node via the wireless control interface, the control configuration for the relaying operation comprises: transmitting the control configuration using a second RAT.

Aspect 70: The method of any of Aspects 53-69, wherein communicating, with the relay node via the wireless link associated with the wireless control interface, to perform the relaying operation in accordance with the control configuration comprises: communicating, with the relay node via the wireless link associated with the wireless control interface, using a first operating frequency; and wherein transmitting, to the control node via the wireless control interface, the control configuration for the relaying operation comprises: transmitting the control configuration using a second operating frequency.

Aspect 71: The method of any of Aspects 53-70, wherein transmitting, to the relay node via the wireless control interface, the control configuration for the relaying operation comprises: transmitting the control configuration using at least one of: radio resource control signaling, medium access control signaling, downlink control information signaling, lower-layer signaling, upper-layer signaling, or application-layer signaling.

Aspect 72: The method of any of Aspects 53-71, wherein the control configuration for the relaying operation indicates at least one of: a receive configuration, a transmit configuration, a reporting configuration, a numerology configuration, a beamforming configuration, resource element mapping information, channel estimation information, modulation order information, layer mapping information, a precoding configuration, one or more scrambling identifiers, or a network coding configuration.

Aspect 73: The method of Aspect 72, wherein the receive configuration indicates at least one of: a receive analog beamforming configuration, a time domain resource allocation associated with the relay node receiving uplink communications, receive frequency information, an analog-to-digital conversion configuration, or an in-phase/quadrature (IQ) sample compression setting.

Aspect 74: The method of any of Aspects 72-73, wherein the transmit configuration indicates at least one of: a transmit analog beamforming configuration, a time domain resource allocation associated with the relay node transmitting downlink communications, a transmit power setting, a transmit amplification setting, a transmit center frequency, or an in-phase/quadrature (IQ) sample decompression setting.

Aspect 75: The method of any of Aspects 72-74, wherein the reporting configuration indicates a request for at least one of: a buffer status of the relay node, a power status of the relay node, a measurement report indicating measurements performed by the relay node, or one or more relaying capabilities of the relay node.

Aspect 76: The method of any of Aspects 72-75, wherein the numerology configuration indicates at least one of: a cyclic prefix size to be used by the relay node, a subcarrier spacing size to be used by the relay node, or a fast Fourier transform size to be used by the relay node.

Aspect 77: The method of any of Aspects 72-76, wherein the beamforming configuration indicates one or more beam indexes associated with a beamforming codebook stored by the relay node.

Aspect 78: The method of any of Aspects 72-77, wherein the beamforming configuration indicates at least one of: a phase setting for one or more antenna elements of the relay node, or an amplitude setting for one or more antenna elements of the relay node.

Aspect 79: The method of any of Aspects 53-78, wherein the control configuration for the relaying operation includes a set of information elements, and wherein transmitting, to the relay node via the wireless control interface, the control configuration for the relaying operation comprises: dynamically transmitting, to the relay node via the wireless control interface, a first subset of information elements of the set of information elements; and semi-statically transmitting, to the relay node via the wireless control interface, a second subset of information elements of the set of information elements.

Aspect 80: The method of any of Aspects 53-79, wherein the configuration indicating the relaying capability of the relay node indicates at least one of: one or more relaying operations supported by the relay node, one or more digital processing operations supported by the relay node, beamforming codebook information associated with a beamforming codebook stored by the relay node, a beamforming configuration capability of the relay node, a transmit power configuration of the relay node, a buffer status of the relay node, a conversion configuration associated with converting between analog signals and digital signals, or an in-phase/quadrature (IQ) sample compression capability.

Aspect 81: The method of any of Aspects 53-80, wherein the relay node is a Layer 1 relay node.

Aspect 82: An apparatus for wireless communication at a device, comprising a processor; memory coupled with the processor; and instructions stored in the memory and executable by the processor to cause the apparatus to perform the method of one or more of Aspects 1-52.

Aspect 83: A device for wireless communication, comprising a memory and one or more processors coupled to the memory, the one or more processors configured to perform the method of one or more of Aspects 1-52.

Aspect 84: An apparatus for wireless communication, comprising at least one means for performing the method of one or more of Aspects 1-52.

Aspect 85: A non-transitory computer-readable medium storing code for wireless communication, the code comprising instructions executable by a processor to perform the method of one or more of Aspects 1-52.

Aspect 86: A non-transitory computer-readable medium storing a set of instructions for wireless communication, the set of instructions comprising one or more instructions that, when executed by one or more processors of a device, cause the device to perform the method of one or more of Aspects 1-52.

Aspect 87: An apparatus for wireless communication at a device, comprising a processor; memory coupled with the processor; and instructions stored in the memory and executable by the processor to cause the apparatus to perform the method of one or more of Aspects 53-81.

Aspect 88: A device for wireless communication, comprising a memory and one or more processors coupled to the memory, the one or more processors configured to perform the method of one or more of Aspects 53-81.

Aspect 89: An apparatus for wireless communication, comprising at least one means for performing the method of one or more of Aspects 53-81.

Aspect 90: A non-transitory computer-readable medium storing code for wireless communication, the code comprising instructions executable by a processor to perform the method of one or more of Aspects 53-81.

Aspect 91: A non-transitory computer-readable medium storing a set of instructions for wireless communication, the set of instructions comprising one or more instructions that, when executed by one or more processors of a device, cause the device to perform the method of one or more of Aspects 53-81.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a relay node, comprising:
   receiving, from a control node via a wireless control interface, a control configuration for a relaying operation;
   receiving, via a first wireless link, a first communication based at least in part on the control configuration for the relaying operation;
   generating, using a digital processing operation indicated by the control configuration, a second communication based at least in part on an information associated with the first communication, including:
   digitally processing the first communication in accordance with the control configuration for the relaying operation;
   determining the information associated with the first communication based at least in part on the digital processing of the first communication; and
   generating the second communication that includes a second information that indicates the information associated with the first communication;
   wherein the second communication is different than the first communication; and
   transmitting, via a second wireless link, the second communication based at least in part on the control configuration for the relaying operation.

2. The method of claim 1, wherein receiving, via the first wireless link, the first communication, comprises:
   receiving the first communication using a first operating frequency; and
   wherein transmitting, via the second wireless link, the second communication, comprises:
   transmitting the second communication using the first operating frequency or a second operating frequency.

3. The method of claim 1, wherein the information associated with the first communication indicates transmit configuration information associated with the second communication.

4. The method of claim 1, wherein receiving, via the first wireless link, the first communication, is based at least in part on the control configuration for the relaying operation.

5. The method of claim 1, wherein the control configuration for the relaying operation indicates the information associated with relaying the first communication.

6. The method of claim 1, further comprising:
   establishing, by a mobile terminal unit of the relay node, the wireless control interface with the control node.

7. The method of claim 1, wherein receiving, via the first wireless link, the first communication, comprises:
   receiving the first communication using an operating frequency; and
   wherein receiving, from the control node via the wireless control interface, the control configuration for the relaying operation comprises:
   receiving the control configuration using the operating frequency.

8. The method of claim 1, wherein receiving, via the first wireless link, the first communication, comprises:
   receiving the first communication using a first radio access technology (RAT); and
   wherein receiving, from the control node via the wireless control interface, the control configuration for the relaying operation comprises:
   receiving the control configuration using a second RAT.

9. The method of claim 1, wherein receiving, via the first wireless link, the first communication, comprises:
   receiving the first communication using a first operating frequency; and
   wherein receiving, from the control node via the wireless control interface, the control configuration for the relaying operation, comprises:
   receiving the control configuration using a second operating frequency.

10. The method of claim 1, wherein transmitting, via the second wireless link, the second communication comprises:
    transmitting the second communication using a first radio access technology (RAT); and wherein receiving, from the control node via the wireless control interface, the control configuration for the relaying operation comprises:
receiving the control configuration using a second RAT.

11. The method of claim 1, wherein transmitting, via the second wireless link, the second communication, comprises:
transmitting the second communication using a first operating frequency; and
wherein receiving, from the control node via the control interface, the control configuration for the relaying operations, comprises:
receiving the control configuration using a second operating frequency.

12. The method of claim 1, wherein the control configuration for the relaying operation indicates at least one of:
a receive configuration,
a transmit configuration,
a reporting configuration,
a numerology configuration,
a beamforming configuration,
resource element mapping information,
channel estimation information,
modulation order information,
layer mapping information,
a precoding configuration,
one or more scrambling identifiers, or
a network coding configuration.

13. The method of claim 1, further comprising:
transmitting, to the control node via the wireless control interface, a configuration indicating a relaying capability of the relay node.

14. A relay node for wireless communication, comprising:
a memory; and
one or more processors, coupled to the memory, configured to:
receive, from a control node via a wireless control interface, a control configuration for a relaying operation;
receive, via a first wireless link, a first communication based at least in part on the control configuration for the relaying operation;
generate, using a digital processing operation indicated by the control configuration, a second communication based at least in part on an information associated with the first communication, including:
digitally process the first communication in accordance with the control configuration for the relaying operation;
determine the information associated with the first communication based at least in part on the digital processing of the first communication; and
generate the second communication that includes a second information that indicates the information associated with the first communication;
wherein the second communication is different than the first communication; and
transmit, via a second wireless link, the second communication based at least in part on the control configuration for the relaying operation.

15. The relay node of claim 14, wherein the one or more processors, to receive, via the first wireless link, the first communication, are configured to:
receive the first communication using a first operating frequency; and
wherein the one or more processors, to transmit, via the second wireless link, the second communication, are configured to:
transmit the second communication using the first operating frequency or a second operating frequency.

16. The relay node of claim 14, wherein the information associated with the first communication indicates transmit configuration information associated with the second communication.

17. The relay node of claim 14, wherein receiving, via the first wireless link, the first communication, is based at least in part on the control configuration for the relaying operation.

18. The relay node of claim 14, wherein the control configuration for the relaying operation indicates the information associated with relaying the first communication.

19. The relay node of claim 14, wherein the one or more processors are further configured to:
establish, by a mobile terminal unit of the relay node, the wireless control interface with the control node.

20. The relay node of claim 14, wherein the one or more processors, to receive, via the first wireless link, the first communication, are configured to:
receive the first communication using an operating frequency; and
wherein the one or more processors, to receive, from the control node via the wireless control interface, the control configuration for the relaying operation, are configured to:
receive the control configuration using the operating frequency.

21. The relay node of claim 14, wherein the one or more processors, to receive, via the first wireless link, the first communication, are configured to:
receive the first communication using a first radio access technology (RAT); and
wherein the one or more processors, to receive, from the control node via the wireless control interface, the control configuration for the relaying operation, are configured to:
receive the control configuration using a second RAT.

22. The relay node of claim 14, wherein the one or more processors, to receive, via the first wireless link, the first communication, are configured to:
receive the first communication using a first operating frequency; and
wherein the one or more processors, to receive, from the control node via the wireless control interface, the control configuration for the relaying operation, are configured to:
receive the control configuration using a second operating frequency.

23. The relay node of claim 14, wherein the one or more processors, to transmit, via the second wireless link, the second communication, are configured to:
transmit the second communication using a first radio access technology (RAT); and
wherein the one or more processors, to receive, from the control node via the wireless control interface, the control configuration for the relaying operation, are configured to:
receive the control configuration using a second RAT.

24. The relay node of claim 14, wherein the one or more processors, to transmit, via the second wireless link, the second communication, are configured to:
transmit the second communication using a first operating frequency; and wherein the one or more processors, to receive, from the control node via the control interface, the control configuration for the relaying operations, are configured to:
receive the control configuration using a second operating frequency.

25. The relay node of claim 14, wherein the control configuration for the relaying operation indicates at least one of:
- a receive configuration,
- a transmit configuration,
- a reporting configuration,
- a numerology configuration,
- a beamforming configuration,
- resource element mapping information,
- channel estimation information,
- modulation order information,
- layer mapping information,
- a precoding configuration,
- one or more scrambling identifiers, or
- a network coding configuration.

26. The relay node of claim 14, wherein the one or more processors are further configured to:
transmit, to the control node via the wireless control interface, a configuration indicating a relaying capability of the relay node.

27. A non-transitory computer-readable medium storing a set of instructions for wireless communication, the set of instructions comprising:
one or more instructions that, when executed by one or more processors of a relay node, cause the relay node to:
receive, from a control node via a wireless control interface, a control configuration for a relaying operation;
receive, via a first wireless link, a first communication based at least in part on the control configuration for the relaying operation;
generate, using a digital processing operation indicated by the control configuration, a second communication based at least in part on an information associated with the first communication, including:
digitally process the first communication in accordance with the control configuration for the relaying operation;
determine the information associated with the first communication based at least in part on the digital processing of the first communication; and
generate the second communication that includes a second information that indicates the information associated with the first communication;
wherein the second communication is different than the first communication; and
transmit, via a second wireless link, the second communication based at least in part on the control configuration for the relaying operation.

28. An apparatus for wireless communication, comprising:
means for receiving, from a control node via a wireless control interface, a control configuration for a relaying operation;
means for receiving, via a first wireless link, a first communication based at least in part on the control configuration for the relaying operation;
means for generating, using a digital processing operation indicated by the control configuration, a second communication based at least in part on an information of the first communication, including:
digitally process the first communication in accordance with the control configuration for the relaying operation;
determine the information associated with the first communication based at least in part on the digital processing of the first communication; and
generate the second communication that includes a second information that indicates the information associated with the first communication;
wherein the second communication is different than the first communication; and
means for transmitting, via a second wireless link, the second communication based at least in part on the control configuration for the relaying operation.

* * * * *